US007490294B2

(12) United States Patent
Okada

(10) Patent No.: US 7,490,294 B2
(45) Date of Patent: Feb. 10, 2009

(54) INFORMATION PROCESSING DEVICE, INFORMATION PROCESSING METHOD AND INFORMATION PROCESSING PROGRAM

(75) Inventor: Shizue Okada, Kanagawa (JP)

(73) Assignee: Sony Corporation, Tokyo (JP)

( * ) Notice: Subject to any disclaimer, the term of this patent is extended or adjusted under 35 U.S.C. 154(b) by 732 days.

(21) Appl. No.: 10/348,106

(22) Filed: Jan. 21, 2003

(65) Prior Publication Data

US 2003/0164822 A1 Sep. 4, 2003

(30) Foreign Application Priority Data

Jan. 22, 2002 (JP) ............................. 2002-013309

(51) Int. Cl.
*G06F 3/00* (2006.01)
*G06F 9/00* (2006.01)
*G06F 17/00* (2006.01)

(52) U.S. Cl. ....................... 715/762; 715/763; 715/764; 345/204; 340/990; 701/200

(58) Field of Classification Search ................. 345/204; 709/217; 715/501.1, 762, 763, 764; 340/990, 340/995; 701/200
See application file for complete search history.

(56) References Cited

U.S. PATENT DOCUMENTS 6,023,241 A * 2/2000 Clapper ................. 342/357.13
6,133,947 A * 10/2000 Mikuni ........................ 348/143
7,136,093 B1 * 11/2006 Itoh et al. .............. 348/207.11
2002/0011951 A1 * 1/2002 Pepin et al. ............ 342/357.13
2002/0091793 A1 * 7/2002 Sagie ......................... 709/217
2002/0141289 A1 * 10/2002 Hayek et al. .................. 368/47
2003/0024975 A1 * 2/2003 Rajasekharan .............. 235/375
2003/0155413 A1 * 8/2003 Kovesdi et al. .............. 235/375
2004/0039525 A1 * 2/2004 Draeger et al. .............. 701/211
2004/0077359 A1 * 4/2004 Bernas et al. ............ 455/456.1

FOREIGN PATENT DOCUMENTS

JP 408320649 A * 12/1996
JP 02001344249 A * 12/2001

OTHER PUBLICATIONS

Armenia: Travel Guide (http://web.archive.org/web/20010110084200/http://www.armgate.com/travel/index.html), Copyright 1999-2000.*

* cited by examiner

*Primary Examiner*—Dennis-Doon Chow
*Assistant Examiner*—Anita D Chaudhuri
(74) *Attorney, Agent, or Firm*—Finnegan, Henderson, Farabow, Garrett & Dunner, L.L.P.

(57) ABSTRACT

An information processing device which enables display of guide information made up of characters, images and map data related to destinations and facilities of interest, in association with user information made up of texts and images recorded by the user, is provided. User information in the form of text data as well as guide information is displayed in an explanation display part. A photograph or illustration of facilities is displayed in an image display part. A map showing routes to facilities of interest from principal public facilities is displayed in a map display part. Since the latitude and longitude is recorded in map data irrespective of whether its format is a vector format or image format, the position of the facilities can be displayed from positioning information acquired from other equipments. Moreover, the setting of destinations and navigation including route guide are possible.

17 Claims, 21 Drawing Sheets

After version-up

```
<poi>
    <pos>
        <lat>35.6550</lat>
        <lon>139.7486</lon>
    </pos>
    <name>
        <nb>Tokyo Tower</nb>
    </name>
    <address>
        <address-text>4-chome, Shibakoen, Minato-ku, Tokyo</address-text>
    </address>
    <zip>108-XXXX</zip>
    <note>Telephone number 03-5XXX-XXXX</note>
</poi>
```

FIG. 10

```
<poi>
    <pos>
        <lat>35.6550</lat>
        <lon>139.7486</lon>
    </pos>
    <name>
        <nb>Tokyo Tower</nb>
    </name>
    <address>
        <address-text>4-chome, Shibakoen, Minato-ku, Tokyo</address-text>
    </address>
    <zip>108-XXXX</zip>
    <note>Telephone number 03-5XXX-XXXX</note>
</poi>
<linkfile>
    <text href="......../MEMO.TXT">
    </text>
</linkfile>
```

Link to user information

```
MEMO.TXT
The night view is very beautiful.
```

FIG.13

After version-up

Before version-up

After version-up

Before version-up

INFORMATION PROCESSING DEVICE, INFORMATION PROCESSING METHOD AND INFORMATION PROCESSING PROGRAM

BACKGROUND OF THE INVENTION

1. Field of the Invention

This invention relates to an information processing device and an information processing method for electronically precessing various guide information such as character-based explanatory information about facilities and spots of interest like tourist facilities, places where one can enjoy events, and sight-seeing spots, information about routes and transportation, image information such as maps and photographs, and language information about languages used at and around the facilities and spots of interest. This invention also relates to an information processing program executed by hardware, which is the information processing device.

This application claims priority of Japanese Patent Application No. 2002-013309, filed on Jan. 22, 2002, the entirety of which is incorporated by reference herein.

2. Description of the Related Art

Conventionally, in traveling, the travelers must carry many bulky travel guidebooks, dictionaries and conversation guidebooks. While there are some portable terminals for displaying road maps thereon and thus performing navigation as tools for travel, only the place where the user is now is displayed on the map as in car navigation devices.

Although there are electronic travel guidebooks to read, there are no electronic travel guidebooks which display the place where the user is now or enable intake of information gathered by word of mouth or information gathered from friends, as POI (point of interest). Moreover, there are no electronic travel guidebooks interlocked with photographs taken by the user so that the user can enjoy both.

SUMMARY OF THE INVENTION

In view of the foregoing status of the art, it is an object of the present invention to provide an information processing device, an information processing method and an information processing program which enable display of guide information made up of characters, images and map data related to destinations and facilities of interest, in association with user information made up of texts and images recorded by the user.

It is another object of the present invention to provide an information processing device, an information processing method and an information processing program which enable display of routes and the place where the user is now, as well as guide information made up of characters, images and map data related to destinations and facilities of interest.

It is still another object of the present invention to provide an information processing device, an information processing method and an information processing program which enable recording or output of guide information made up of characters, images and map data related to destinations and facilities of interest, in association with user information made up of texts and images recorded by the user.

An information processing device according to the present invention is adapted for processing guide information made up of characters, images and map data related to destinations and facilities of interest. The information processing device comprises: display means for displaying said guide information; and control means for causing said display means to display said guide information in association with user information recorded by a user.

An information processing device according to the present invention is adapted for processing guide information made up of characters, images and map data related to destinations and facilities of interest. The information processing device comprises: display means for displaying said guide information; and control means for causing said display means to display images taken by a user in place of the guide information made up of said images.

An information processing device according to the present invention is adapted for processing guide information made up of characters, images and map data related to destinations and facilities of interest. The information processing device comprises: display means for displaying said guide information; and control means for causing said display means to display a present position mark corresponding to positioning information obtained by measuring a present position and routes to said destinations and facilities of interest.

An information processing device according to the present invention is adapted for processing guide information made up of characters, images and map data related to destinations and facilities of interest. The information processing device comprises control means for saving to a recording medium or outputting to outside, user information recorded by a user as well as said guide information.

An information processing method according to the present invention is adapted for processing guide information made up of characters, images and map data related to destinations and facilities of interest. The information processing method comprises causing display means for displaying said guide information to display said guide information in association with user information recorded by a user.

An information processing method according to the present invention is adapted for processing guide information made up of characters, images and map data related to destinations and facilities of interest. The information processing method comprises causing display means for displaying said guide information to display images taken by a user in place of the guide information made up of said images.

An information processing method according to the present invention is adapted for processing guide information made up of characters, images and map data related to destinations and facilities of interest. The information processing method comprises causing display means for displaying said guide information to display a present position mark corresponding to positioning information obtained by measuring a present position and routes to said destinations and facilities of interest.

An information processing method according to the present invention is adapted for processing guide information made up of characters, images and map data related to destinations and facilities of interest. The information processing method comprises saving to a recording medium or outputting to outside, user information recorded by a user as well as said guide information.

An information processing program according to the present invention is executed by an information processing device for processing guide information made up of characters, images and map data related to destinations and facilities of interest. The information processing program comprises causing display means for displaying said guide information to display said guide information in association with user information recorded by a user.

An information processing program according to the present invention is executed by an information processing device for processing guide information made up of characters, images and map data related to destinations and facilities of interest. The information processing program comprises causing display means for displaying said guide information to display images taken by a user in place of the guide information made up of said images.

An information processing program according to the present invention is executed by an information processing device for processing guide information made up of characters, images and map data related to destinations and facilities of interest. The information processing program comprises causing display means for displaying said guide information to display a present position mark corresponding to positioning information obtained by measuring a present position and routes to said destinations and facilities of interest.

An information processing program according to the present invention is executed by an information processing device for processing guide information made up of characters, images and map data related to destinations and facilities of interest. The information processing program comprises saving to a recording medium or outputting to outside, user information recorded by a user as well as said guide information.

According to the present invention, user information made up of texts and images recorded by the user can be displayed in association with guide information made up of characters, images and map data about destinations and facilities of interest.

According to the present invention, the present position of the user and routes can be displayed as well as guide information made up of characters, images and map data about destinations and facilities of interest.

According to the present invention, user information made up of texts and images recorded by the user can be recorded or outputted in association with guide information made up of characters, images and map data about destinations and facilities of interest.

BRIEF DESCRIPTION OF THE DRAWINGS

FIG. 10 shows an exemplary description of POI information.

FIG. 13 shows an exemplary description of POI information with a link file added thereto.

DESCRIPTION OF THE PREFERRED EMBODIMENTS

Figure 1:
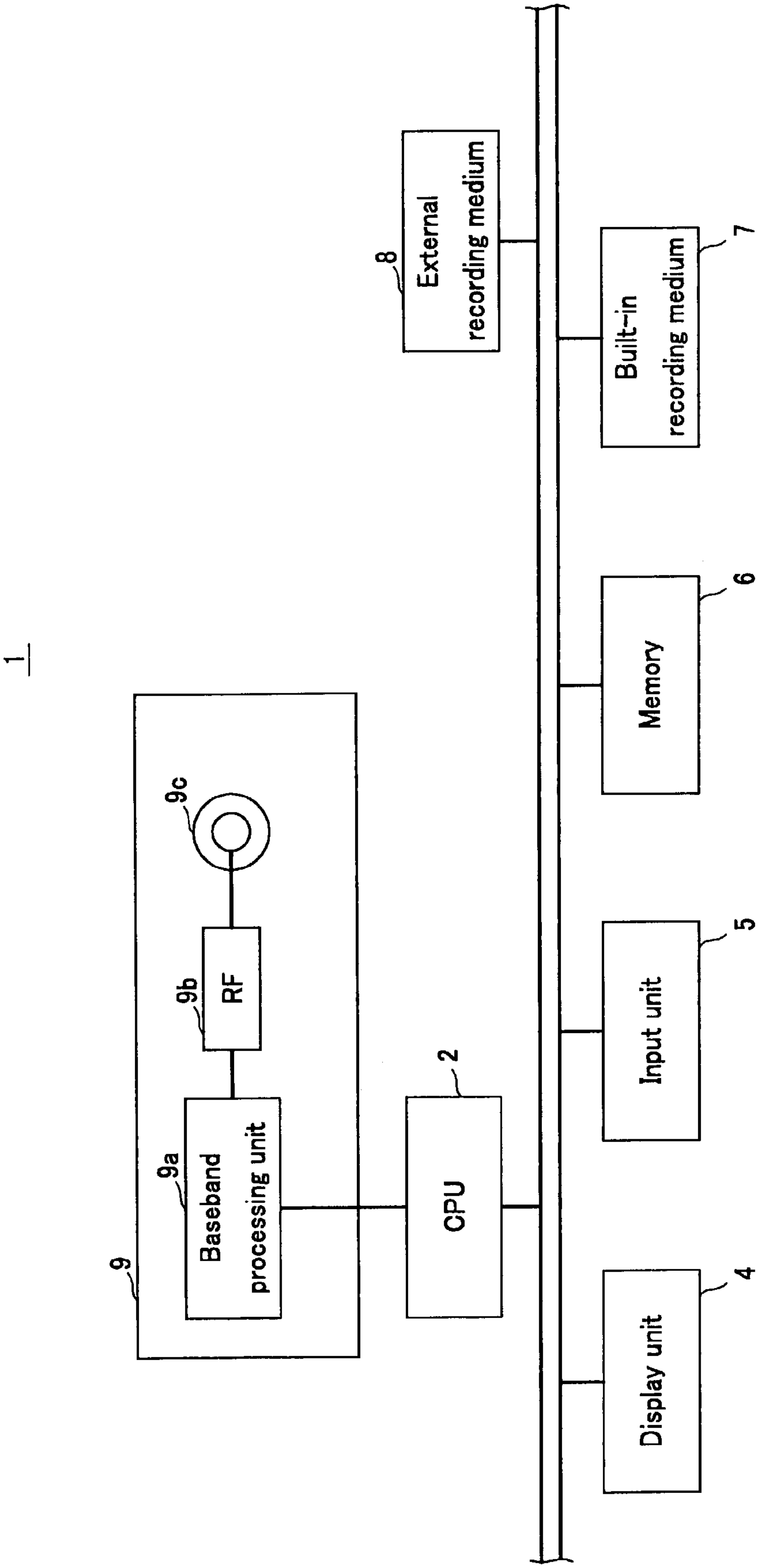
FIG. 1 is a block diagram showing an electronic guide device of a first embodiment.

Hereinafter, some embodiments of the present invention will be described with reference to the drawings. The following embodiments apply to electronic guide devices which displays, on display units, guide information about facilities and spots of interest and tourist resorts such as tourist facilities, places where one can enjoy events, sight-seeing spots, and places to visit.

The guide information in this description means various information such as explanatory information about facilities and spots of interest, image information including maps and photographs, local climates and climates around facilities and spots of interest, transportation guide, basic local information including how to make a phone call in the case of foreign countries, language information about local languages and dictionaries, tourist resort information, and POI (point of interest information) of hotels, restaurants and shops. Such guide information is constructed as databases of the formats of texts, images (still images, dynamic images, maps, etc.), vectors, and POI format. Of such information, information having particular positions also include latitude and longitude information.

Moreover, the electronic guide devices can additionally record user-specific information (hereinafter referred to as user information). By displaying the user information in association with the guide information, the user can make the guide device unique to the user himself/herself.

The user information includes information gathered by the user himself/herself, information gathered by word of mouth, and information gathered from the user's friends. The user information is often written, accompanying places. For example, "*It's a must*" may be written in association with [O O Museum of Art] in the guide information, or a comment "xxxx is recommended" is written in association with [∆∆ Restaurant]. Information about each of new sight-seeing spots and restaurants may be written. Moreover, not only the information accompanying places but also necessary personal data for travel such as telephone number for emergency contact and passport number. Such user information can be written, for example, in the form of text file. Of course, the user information may be photographs taken by the user himself/herself.

Meanwhile, the contents of travel guidebooks as publications change with the lapse of time. Such travel guidebooks are revised at certain time intervals, for example, once a year or once a few years, and thus published. Not all the information is updated at the time of revision. In most cases, places appearing in the guidebooks are not changed but comments, closing time and the like are changed. The names and locations of facilities are not changed.

In the electronic guide devices, version-up of data may be similarly carried out. The present invention is to avoid changing the user information together with the guide information in this case. That is, in the electronic guide devices, a guide information change program based on a guide information change method according to the present invention is loaded and executed, thus changing only the guide information provided from the vendor side while leaving the user information written by the user unchanged. Guide information change processing that is carried out as the electronic guide device executes the guide information change program will be later described in detail.

First, an electronic guide device 1 will be described with reference to FIGS. 1 to 4. This electronic guide device 1 has a CPU 2, and a display unit 4, an input unit 5, a memory 6, a built-in recording medium 7 and an external recording medium 8 which are connected with the CPU 2 via an internal bus 3, as shown in FIG. 1. Also a radio communication unit 9 is connected with the CPU 2.

The CPU 2 executes an electronic guide program which enables display of user information as well as guide information.

The built-in recording medium 7 is a semiconductor memory, or a disc-shaped recording medium such as an optical disc, a magneto-optical disc or a magnetic disk. The guide information and the user information are recorded in the built-in recording medium 7. Also the electronic guide program is recorded therein.

The external recording medium 8, too, is a semiconductor memory, or a disc-shaped recording medium such as an optical disc, a magneto-optical disc or a magnetic disk. The guide information, the user information and the electronic guide information may be recorded therein.

The display unit 4 is, for example, a liquid crystal display unit (LCD) and is adapted for displaying the guide information made up of images, photographs or characters, and the user information.

The input unit 5 is, for example, a key operator or a pad input unit for accepting pen input.

The radio communication unit 9 is made up of a baseband processing unit 9*a,* an RF processing unit 9*b,* and a radio communication antenna 9*c,* and is adapted for receiving positioning information from other equipments. This radio communication unit 9 employs a radio communication technique based on the local radio function.

The radio communication technique based on the local radio function is, for example, a radio communication technique called Bluetooth, using a 2.4-GHz ISM (industrial, scientific and medical) band, which is the same as the band used in wireless LAN (WLAN) communication conformable to the IEEE802.11 standard for direct sequence spread spectrum (DSSS) radio communication and the like. Generally, this radio communication technique is suitable for transmission of data to another device situated at a distance of 10 m or less.

The positioning information received by the radio communication unit 9 is sent from, for example, a car navigation device having the Global Positioning System (GPS), a dedicated GPS receiver or a portable telephone unit. That is, the above-described other equipments are a car navigation device, a dedicated GPS receiver, a portable telephone unit and the like.

Of course, when receiving the positioning information, the electronic guide device 1 sends a request signal for the positioning information to the other equipments. The request signal from the CPU 2 is signal-processed by the baseband processing unit 9*a,* then put on a transmission wave by the RF processing unit 9*b,* and sent by radio transmission from the radio communication antenna 9*c* to the other equipments. On the other hand, radio waves sent by radio transmission-from the other equipments are received at the radio communication antenna 9*c*. Signals are extracted from the radio waves by the RF processing unit 9*b,* then signal-processed by the baseband processing unit 9*a,* and sent to the CPU 2.

Figure 2:
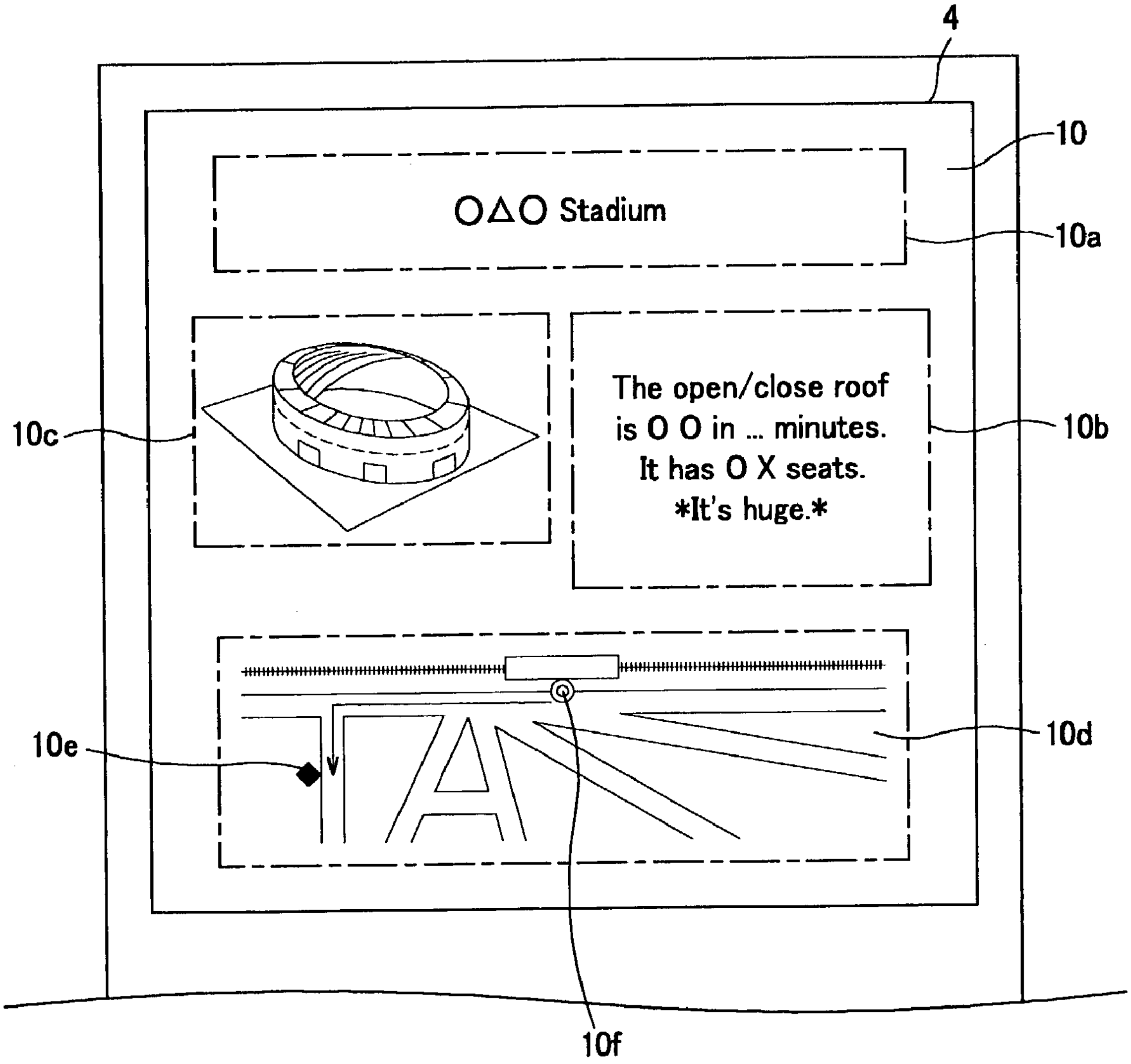
FIG. 2 shows an exemplary display on the electronic guide device.

FIG. 2 shows an exemplary screen display 10 on the display unit 4 of the electronic guide device 1. The name of facilities of interest is displayed in the form of text data in a title display part 10*a* on the screen, and explanatory information of the facilities is displayed in the form of text data in an explanation display part 10*b.* User information in the form of text data as well as guide information is displayed, as will be described later. Moreover, a photograph or illustration of the facilities is displayed in an image display part 10*c* and a map showing routes to the facilities of interest from principal public facilities is displayed in a map display part 10*d.* Since the latitude and longitude are recorded in map data irrespective of whether its format is a vector format or image format, the location of the facilities can be displayed from the positioning information acquired from other equipments. Also the setting of destination and navigation including route guide are possible.

Figure 3:
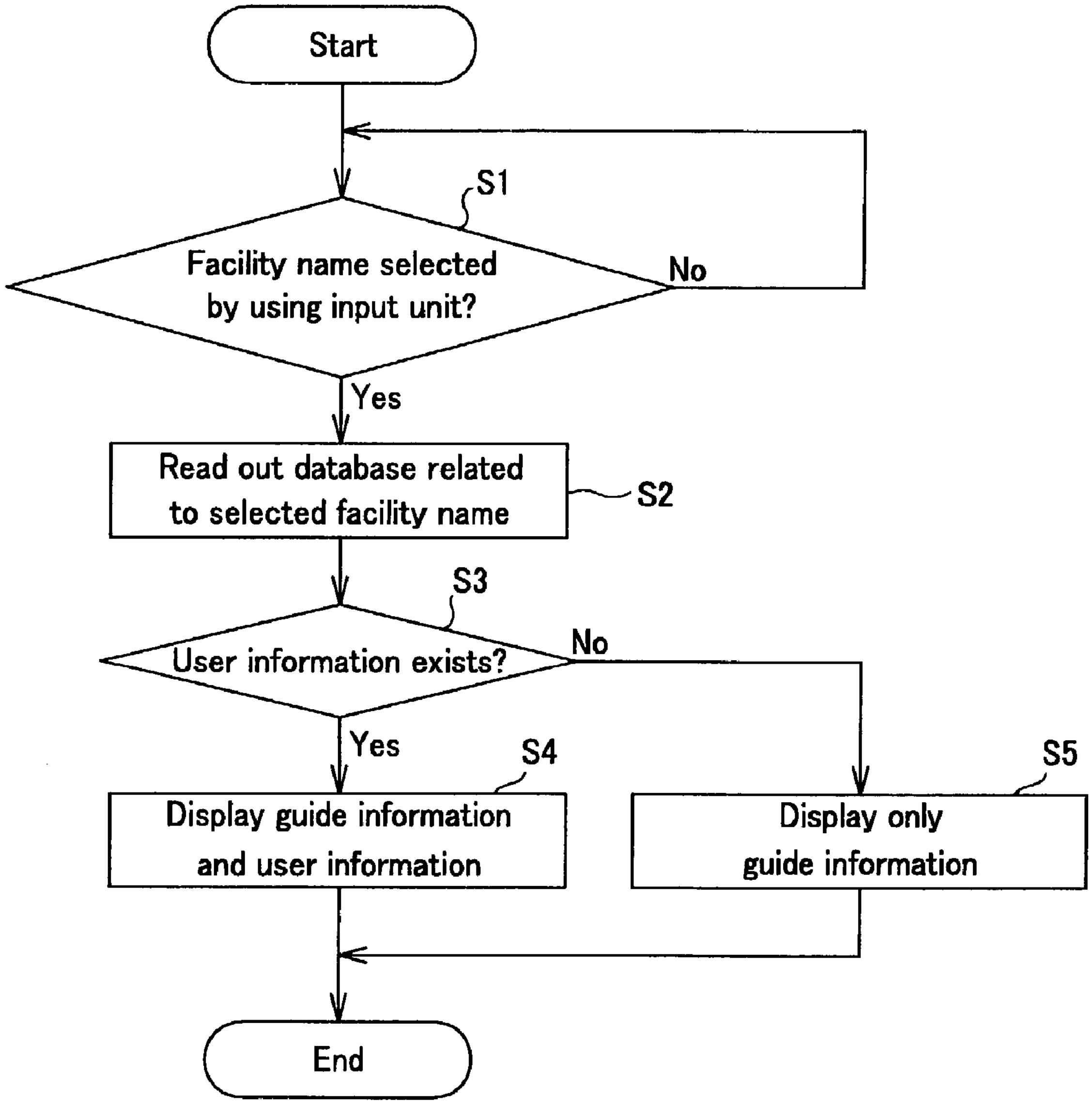
FIG. 3 is a flowchart for explaining the operation of the electronic guide device.

The operation of the electronic guide device 1 will now be described with reference to the flowchart of FIG. 3 and a selection screen shown in FIG. 4. It is the operation up to when the user selects a name of facilities of interest using the input unit 4 and the exemplary screen display of FIG. 2 is displayed. The power of the electronic guide device 1 has already been turned on. The CPU 2 has read out the electronic guide program from the built-in recording medium 7 or the external recording medium 8 in accordance with the operation by the user and has just started execution of the program using the memory 6.

Figure 4:
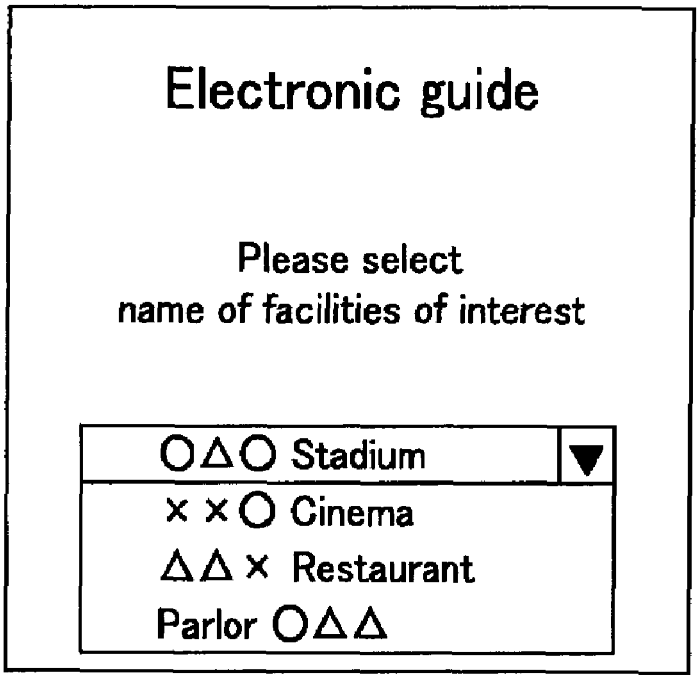
FIG. 4 shows an exemplary selection screen on the electronic guide device.

First, as a facility name "OΔO Stadium" is selected as shown in FIG. 4 by the user using the input unit 4 at step S1, the electronic guide device 1 refers to a database related to the selected facility name, in the built-in recording medium 7 or the external recording medium 8 (step S2).

The electronic guide device 1 confirms at step S3 whether user information is also stored in the database or not. If the electronic guide device 1 judges that user information exists (YES), guide information and user information are displayed on the display unit 4 at step S4. If the electronic guide device 1 judges at step S3 that user information does not exist (NO), only guide information is displayed on the display unit 4 (step S5).

Thus, since the user can view the guide information of the facilities of interest in the form of texts or images and also can confirm the user information additionally written by the user himself/herself using the input unit 4, the user-friendliness is improved. That is, the electronic guide device 1 has become a guide device unique to the user.

Guide information change processing to avoid change of the user information when the electronic guide device 1 performs version-up of the guide information provided from the vendor side will now be described.

The electronic guide device 1 separately records the guide information and the user information. In the guide information, link information for reference to the user information is described. By doing do, version-up of only the travel guide information can be easily carried out.

Figure 5:
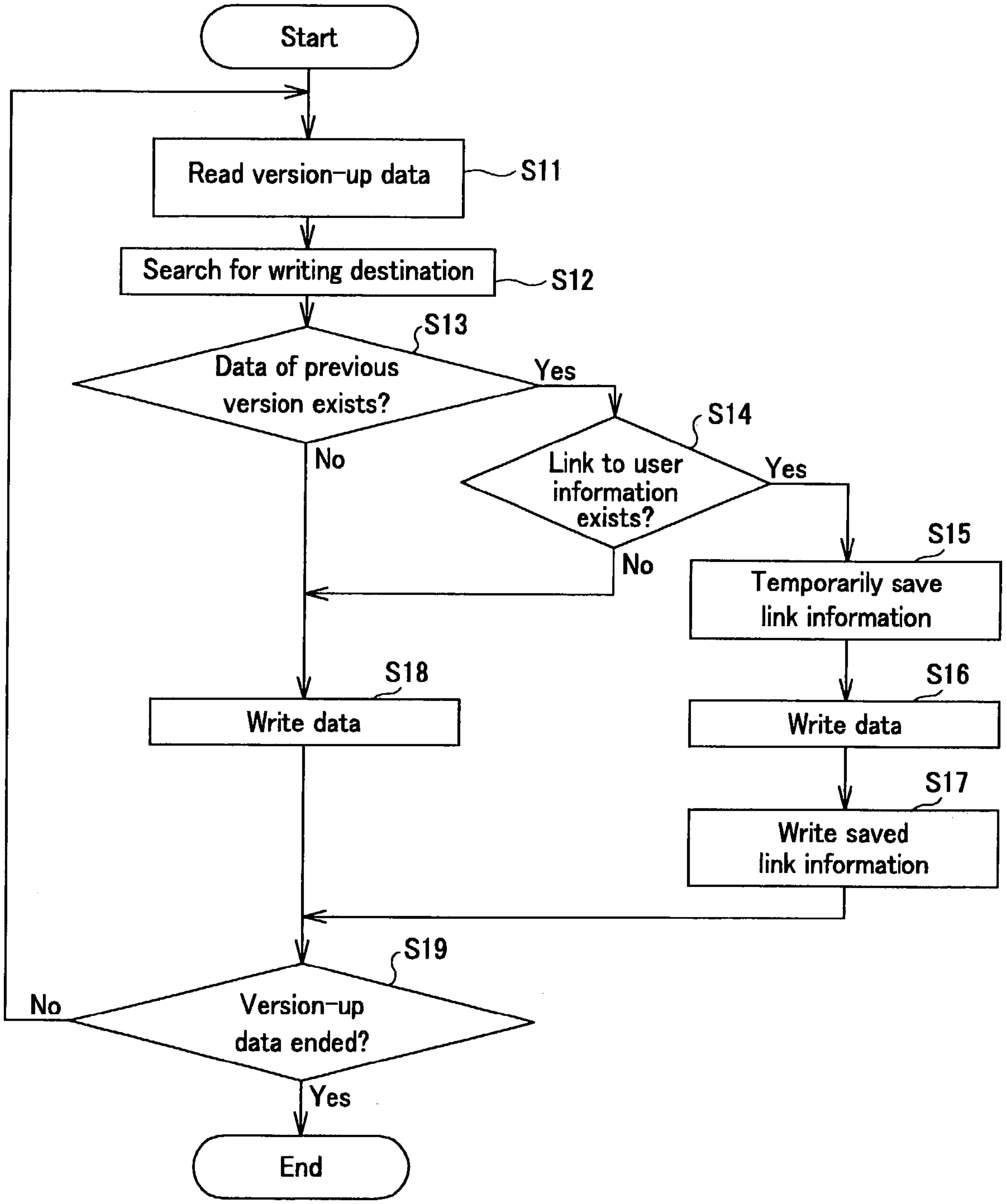
FIG. 5 is a flowchart showing procedures for guide information change processing in the electronic guide device.

FIG. 5 shows procedures for the guide information change processing in the electronic guide device 1. These procedures are processing procedures in the case where, for example, the CPU 2 has executed the guide information change processing program stored in the built-in recording medium 7 or the external recording medium 8. In the following description, it is assumed that version-up data prepared by the vendor side is recorded in the external recording medium 8.

First, at step S11, the CPU 2 reads the version-up data from the external recording medium 8. Next, at step S12, the CPU 2 searches for a writing destination. Then, at step S13, the CPU 2 checks whether data of the previous version exists at the writing destination thus searched for. If the CPU 2 judges that data of the previous version exists (YES), the processing goes to step S14 and the CPU 2 checks whether a link to the user information exists or not. If there is a link (YES), the processing goes to step S15 and the link information is temporarily saved in a separate area in the recording medium or the like. After that, the version-up data is written at step S16. On completion of the writing, the saved link information is written into the version-up data at step S17.

On the other hand, if the CPU 2 judges at step S13 that data of the previous version does not exist, the processing goes to step S18 and the CPU 2 writes the new data. If the CPU 2 judges at step S14 that there is no link to the user information, the processing goes to step S18 and the CPU 2 write the version-up data.

Such processing is repeated until it is judged at step S19 that the version-up data has ended.

By thus loading and executing the guide information change program based on the guide information change method according to the present invention, the guide device 1 can change only the guide information provided from the vendor side while leaving the user information written by the user unchanged.

A second embodiment will now be described with reference to FIGS. 6 and 7. This second embodiment applies to a digital camera 30 used as an electronic guide device. This digital camera 30 can shoot an object and provide its photographic image. The photographic image can be used as the user information and can be displayed on a display unit in association with the guide information. Also this digital camera 30 avoids change of the user information when performing version-up of guide information provided from the vendor side.

First, the basic structure and operation of the digital camera 30 will be described. An image of an object shot by using a lens 36 that is adjusted for focusing by a focus control unit 35 of the digital camera 30, shown in FIG. 6, is converted to an image signal by a CCD 37 and recorded as a digital signal (image data) to an image pickup memory 38. The image (photographic image) of the object is displayed on an LCD 40 via an LCD control unit 39. The user confirms this and presses a shutter 41.

The digital camera 30 also has a recording/reading unit 45 for recording the shot photographic image to a memory card 50, which will be described later, or for reading a photographic image recorded on the memory card 50, and a memory card control unit 46.

The memory card 50 is, for example, a memory stick (trademark registered) or the like, which has been recently used as a popular storage medium for a digital camera or a notebook model PC (personal computer). The memory card 50 is equipped with a flash memory therein so that data can be held and read out.

The digital camera 30 also has a local radio communication unit 31 for realizing a local radio communication function. The local radio communication unit 31 sends and receives data via a communication control unit 43.

Moreover, the digital camera 30 has a CPU 42 for controlling the operation of each part via internal buses. A request signal issued from the digital camera 30 to, for example, a navigation device, is passed through the communication control unit 43 from the CPU 42, then signal-processed by a baseband processing unit 32 of the local radio communication unit 31, put on a transmission wave by the RF processing unit 33, and sent by radio communication from a local radio communication antenna 34 to a navigation device 10. On the other hand, radio waves sent by radio transmission from the navigation device 10 are received at the local radio communication antenna 34. Signals are extracted therefrom by the RF processing unit 33, then signal-processed by the baseband processing unit 32, and sent to the CPU 42 via the communication control unit 43.

The digital camera 30 also has a flash memory 44. This flash memory 44 normally has a program stored therein for operating the CPU 42. When the power is turned on, the program automatically starts. If the digital camera is a high-grade model, it may be considered that various data are stored in this flash memory 44. For example, frame data for ornamenting the frame of a photograph, and character font data for character representation are saved therein. Moreover, the guide information, the user information and the electronic guide program are recorded in the flash memory 44.

In the digital camera 30, the character font data may be saved in the memory card 50. Spot search data which is referred to in accordance with the latitude and longitude may be saved in the flash memory 44 or the memory card 50. Moreover, the guide information, the user information and the electronic guide program may be recorded in the memory card 50.

The digital camera 30 also has an input unit 47 made up of, for example, a key operator, thus enabling input of the user information.

Figure 7:
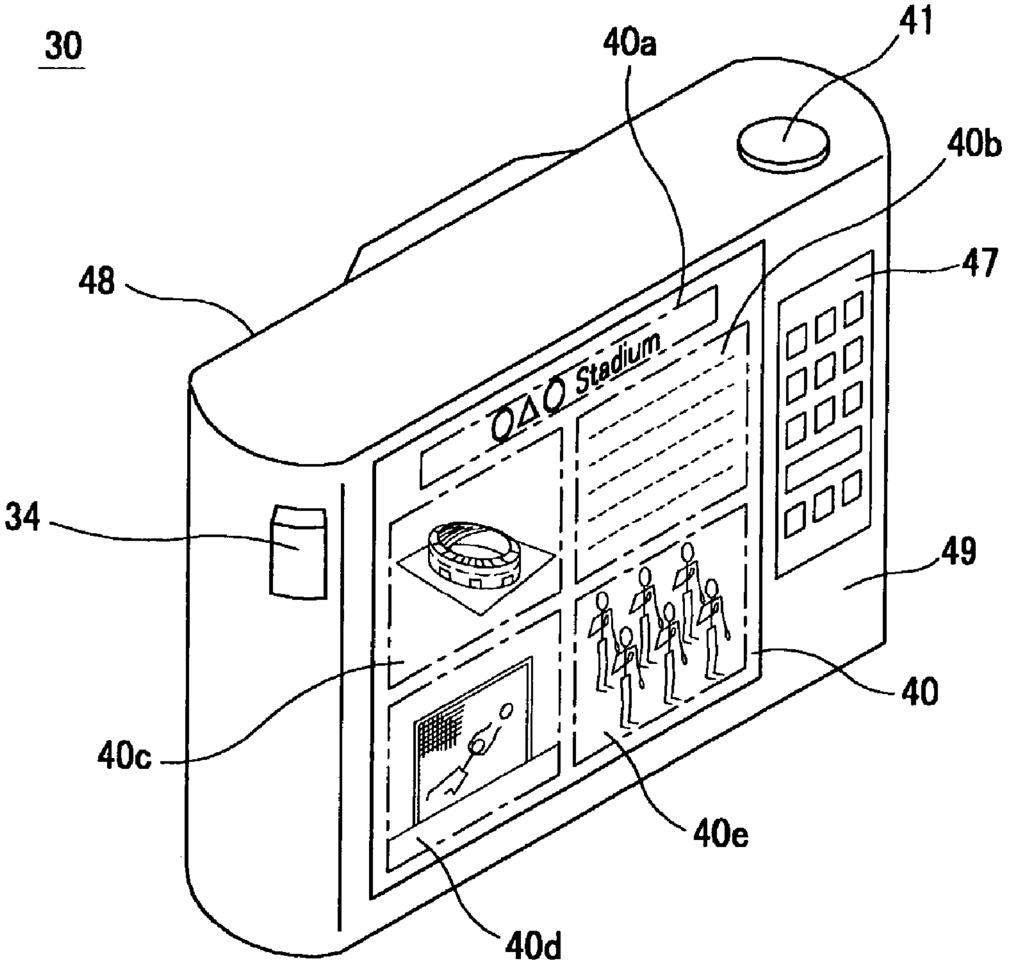
FIG. 7 shows an appearance of the digital camera.

FIG. 7 shows an appearance of the digital camera 30. The lens 36 and the like are arranged on a front side 48. The LCD 40 and the input unit 47 are arranged on a back side 49. The shutter 41 is arranged on a top side and the local radio communication antenna 34 is arranged on a lateral side.

The name of facilities of interest is displayed in the form of text data in a title display part 40*a* on the screen of the LCD 40, and explanatory information of the facilities is displayed in the form of text data in an explanation display part 40*b*. In the explanation display part 40*b*, user information in the form of text data as well as guide information is displayed. In a guide image display part 40*c*, a photograph or illustration of the facilities is displayed as a kind of guide information. In a selected image display part 40*d*, a photographic image taken by the user or one of guide images is displayed. In this example, a photographic image taken by the user is displayed. However, a guide image may be displayed or a map showing routes to the facilities of interest from principal public facilities may be displayed. Moreover, a photographic image taken by the user is displayed in a user image display part 40*e*.

Information gathered by the user, information gathered by word of mouth, and information gathered from the user's friends can be additionally written as user information in the form of text data, like a memorandum, using the provided input unit 47. Information of shops, hotels and restaurants can be additionally written in the POI format. In the case of gathering information from friends, the information may be recorded in the POI format, thereby enabling exchange of data using a recording medium such as the memory stick 50. In the case of the memory stick, GLORIE (Global Location-related Information Exchange File Format) is defined as a location information exchange format. By recording information in this format to the memory stick, additional writing of data can be easily carried out. An exemplary description of POI will be described later.

The processing procedures in the case of operating the digital camera 30 as an electronic guide device are as described above in FIG. 3. However, since the user information includes photographic images as well as text data, the user information in the form of text data and photographic images as well as the guide information is displayed at step S4.

Thus, since the user can view the guide information of the facilities of interest in the form of texts and images and can confirm the user information in the form of text data additionally written by the user himself/herself using the input unit 47 and photographic images taken by the user, the user-friendliness is improved. That is, the digital camera 30 has become a guide device unique to the user.

Also in this digital camera 30, as the CPU 42 executes the guide information change processing program already stored in the flash memory 44 or the memory card 50 in accordance with the procedures shown in FIG. 5, version-up of only the guide information can be easily carried out while leaving the user information made up of text data and image data unchanged.

Figure 8:
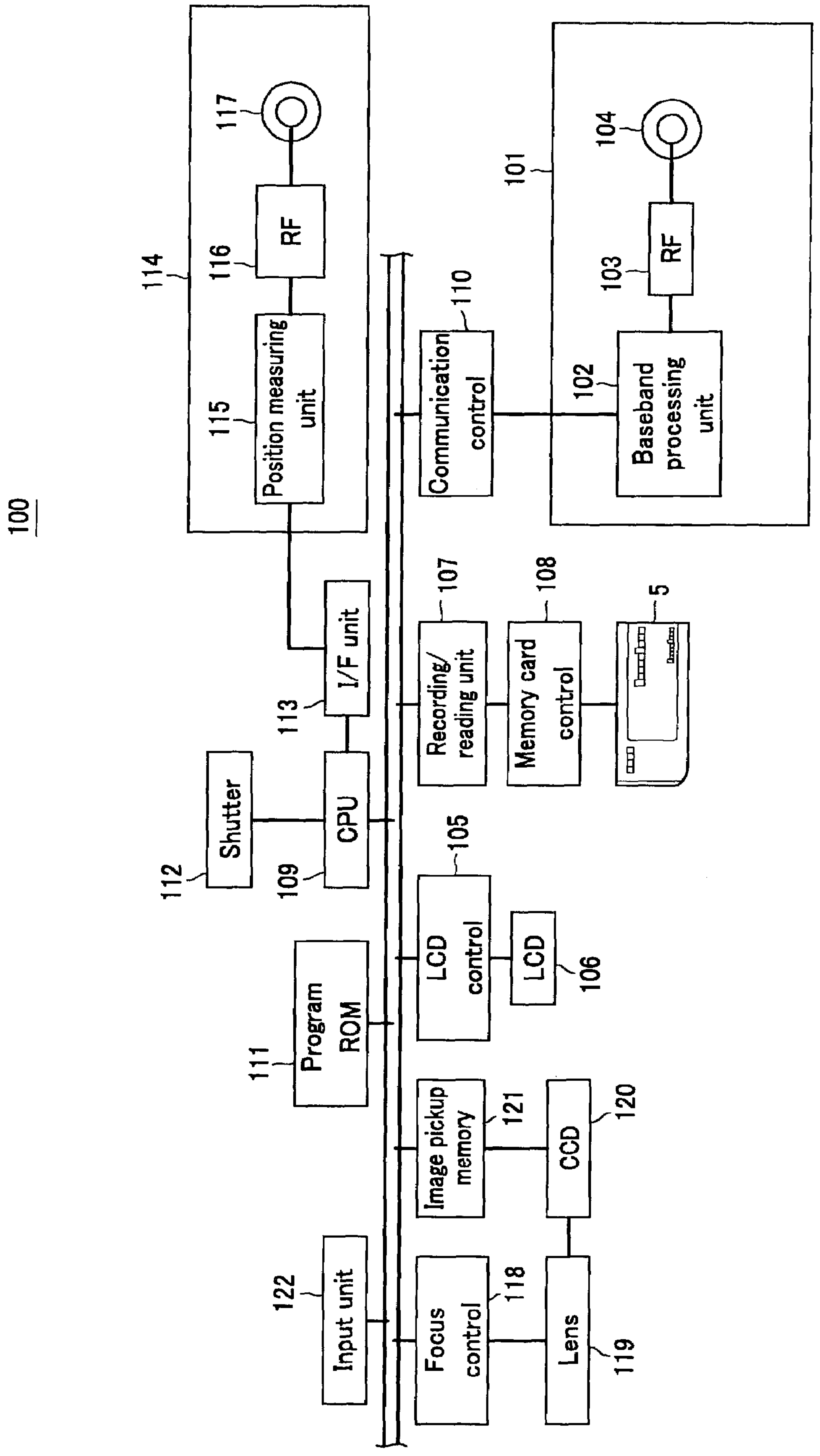
FIG. 8 is a block diagram showing a personal digital assistant of a third embodiment.

A third embodiment will now be described with reference to FIG. 8 to FIGS. 18A and 18B. This third embodiment applies to a personal digital assistant (PDA) 100 shown in FIG. 8, used as an electronic travel guide device. This personal digital assistant 100 displays user information made up of text data and photographic images in association with guide information on a display unit, as in the above-described second embodiment. The personal digital assistant 100 also locates itself and displays the location in a map on the display unit.

Therefore, the personal digital assistant 100 has a GPS unit 114 for receiving GPS signals from GPS satellites and thus measuring the present position. In this GPS unit 114, an RF processing unit extracts signals from radio waves received at a GPS antenna 117 and a position measuring unit 115 calculates the latitude, longitude, altitude, present time and the like of the present position. The positioning technique based on GPS is adapted for finding the distance between a mobile unit and satellites by using C/A (coarse/acquisition) codes contained in L1 radio waves with a carrier frequency of 1575.42 MHZ sent from three or more of the 24 satellites orbiting at an altitude of approximately 20,000 km, and thus calculating the position of the mobile unit. The positioning information of the present position calculated by the GPS unit 114 is sent to the CPU 109 via an interface (I/F) unit 113.

The personal digital assistant 100 also has a built-in program ROM 111, in which an operating system (OS) and application software to be executed following the OS, for example, a digital map display application, are stored. Moreover, application software for performing functions of electronic schedule management, electronic address book, electronic memorandum, action list management and the like, as general PIN (personal information management) functions, and an electronic guide program and the like are stored in the program ROM 111. Also an application for converting positioning information from the GPS unit 114 to position display information on a map as a present position symbol is stored in the program ROM 111. By executing this application, the CPU 109 converts present position data to position information data on a map.

The personal digital assistant 100 also has a LCD 106 for displaying the guide information and user information when the electronic guide program is executed, or for displaying a map image corresponding to map information when the digital map display application is executed by the CPU 109, and an LCD control unit 105 for controlling the LCD 106.

The personal digital assistant 100 also has a recording/reading unit 107 for recording map data to a memory card 5, and a memory card control unit 108.

The personal digital assistant 100 also has a local radio communication unit 101 for acquiring positioning information from other equipments such as a navigation device and a portable telephone unit, instead of the GPS unit 114.

For example, a request signal sent from the personal digital assistant 100 to the other equipments to acquire positioning information is passed through a communication control unit 110 from the CPU 109, then signal-processed by a baseband processing unit 102 of the local radio communication unit 101, put on a transmission wave by an RF processing unit 103, and sent by radio transmission from a local radio communication antenna 104 to the other equipments. On the other hand, radio waves sent by radio transmission from the other equipments are received at the local radio communication antenna 104. Signals are extracted therefrom by the RF processing unit 103, then signal-processed by the baseband processing unit 102, and sent to the CPU 109 via the communication control unit 110.

The personal digital assistant 100 also has an input unit 122 such as a key operator or a pad input unit for accepting pen input.

Figure 6:
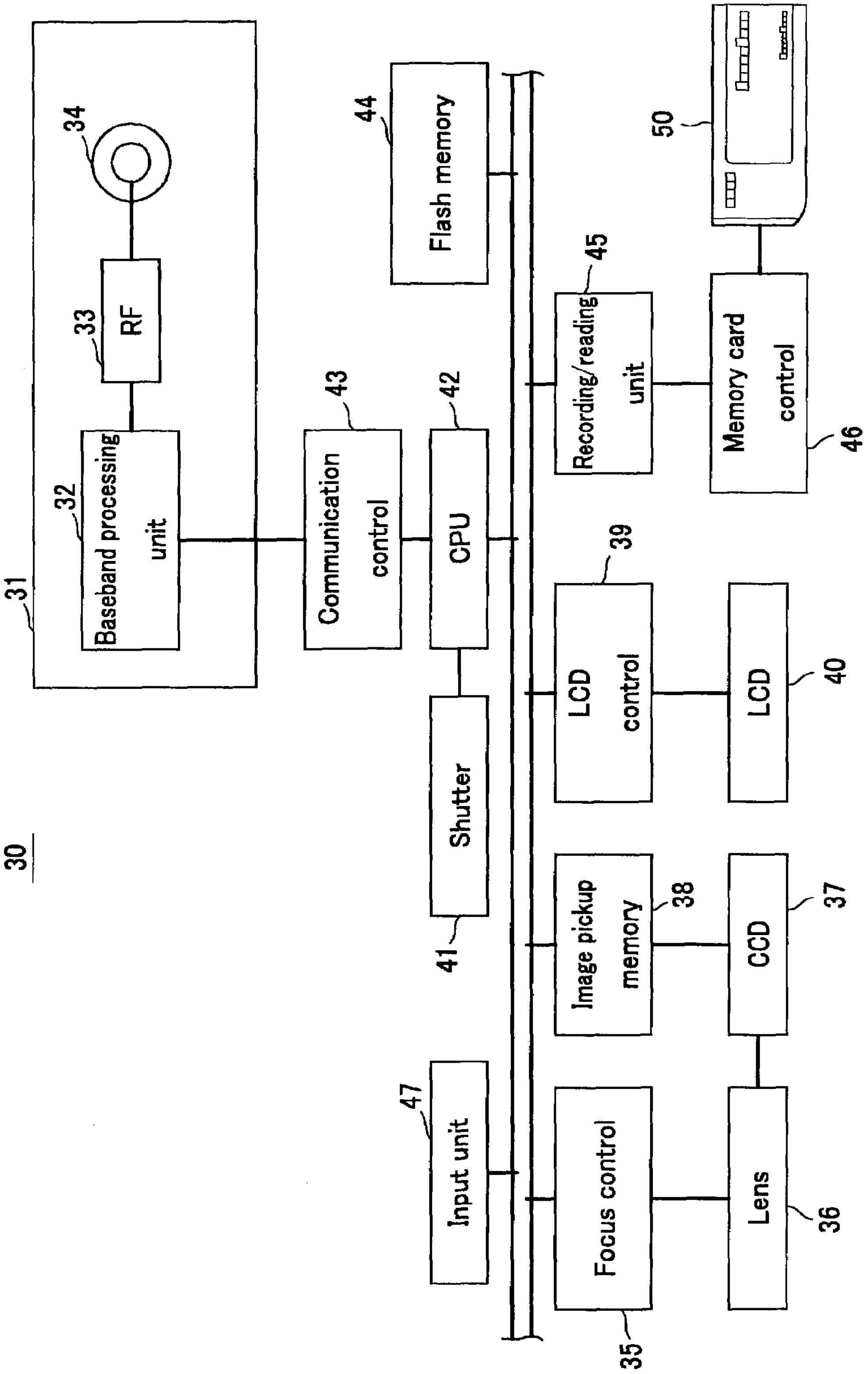
FIG. 6 is a block diagram showing a digital camera of a second embodiment.

Moreover, the personal digital assistant 100 has a focus control unit 118, a lens 119, a CCD 120, an image pickup memory 121, and a shutter 112, in order to shoot an object and acquire its photographic image, as in the digital camera 30 shown in FIG. 6. An image of an object shot by using a lens 119 that is adjusted for focusing by the focus control unit 119 is converted to an image signal by the CCD 120 and recorded as a digital signal (image data) to the image pickup memory 121. This image (photographic image) of the object is displayed on the LCD 106 via the LCD control unit 105. The user confirms this and presses the shutter 112.

Figure 9:
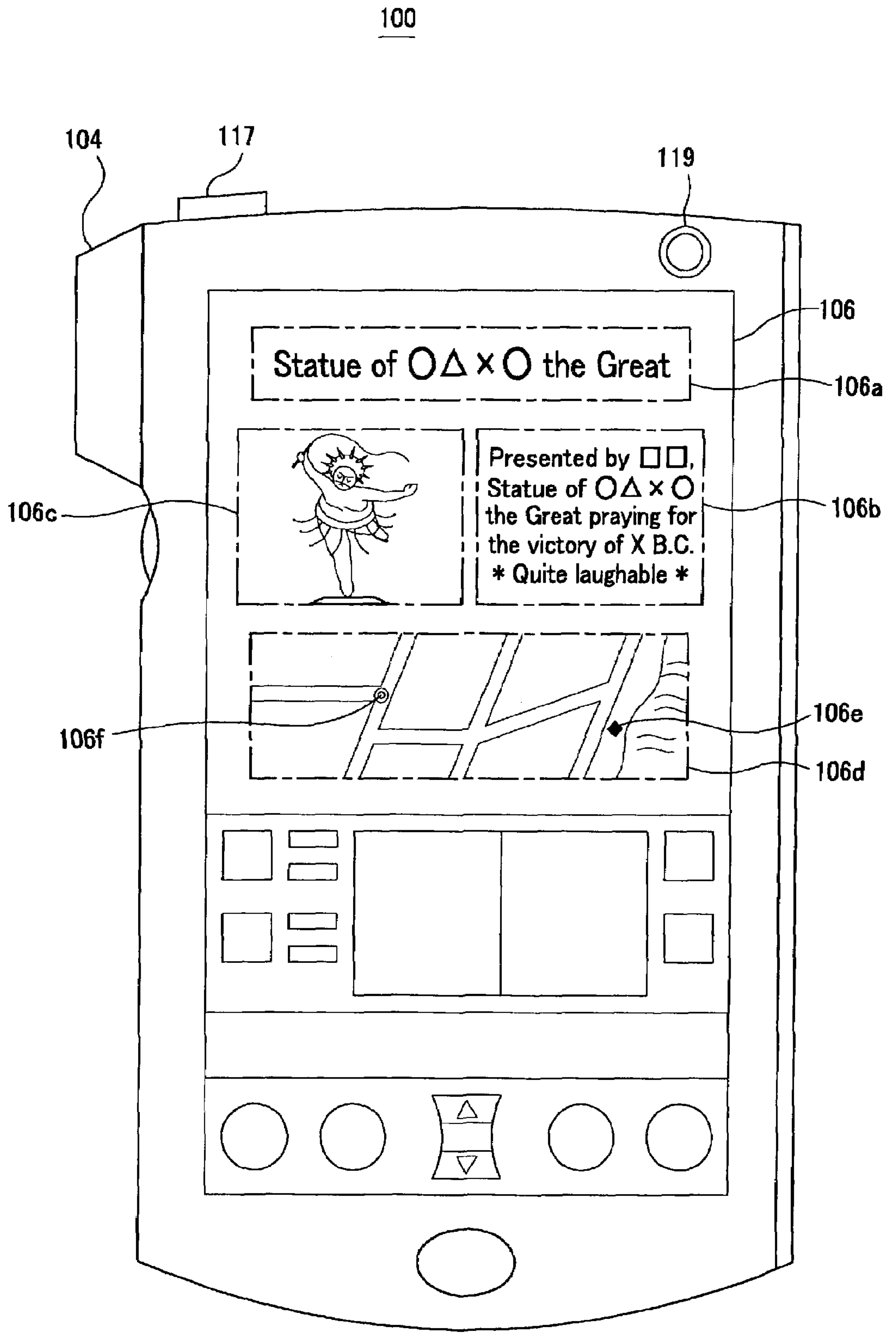
FIG. 9 shows an appearance of and an exemplary display on the personal digital assistant.

FIG. 9 shows an appearance of and an exemplary display on the personal digital assistant 100. The local radio communication antenna 104 is arranged on the left lateral side. The GPS antenna 117 is arranged on the left side on the top part. In a title display part 106*a* of the screen on the LCD 106, a name "Statue of OΔXO the Great" of facilities of interest in the case where the personal digital assistant 100 was used as an electronic travel guide device is displayed. In an explanation display part 106*b*, user information in the form of text data "*quite laughable*" is displayed as well as guide information. In a selected image display part 106*c*, a photographic image showing the appearance of the "Statue of OΔXO the Great" is displayed as a kind of guide information. In the selected image display part 106*c*, a photographic image taken by the user as the user information may be displayed in accordance with the selection by the user. Moreover, in a map display part 106*d*, a location mark 106*e* indicating the location of the "Statue of OΔXO the Great" as the facilities of interest and a present position mark 106*f* measured by the GPS unit 114 of the personal digital assistant 100 are displayed.

In short, as the personal digital assistant 100 is used as an electronic travel guide device, texts, image and map are displayed at the same time. If the user views a map covering the position where the user is now, the user can confirm his/her own position on the map. Since the latitude and longitude are recorded in map data irrespective of whether its format is a vector format or image format, the present position can be displayed using not only positioning information acquired by the GPS unit 114 but also positioning information acquired from other equipments via the local radio communication unit 101. Also the setting of destination and navigation including route guide are possible.

This reminds one that if the electronic guide device 1 shown in FIG. 1 has a GPS unit and a photographing unit, a location mark 10_e_ of facilities of interest and a present position mark 10_f_ can be easily displayed in the map display part 10_d_ of FIG. 2.

POI information will now be described. POI information is effectively used, for example, for displaying the location marks 106_e_ and 10_e_ of facilities of interest on the maps. POI information is also effective when gathering information from friends and adding the information to the user information. Moreover, POI information is effective for data exchange in the case of talking about a travel plan with friends in advance.

Figure 11:
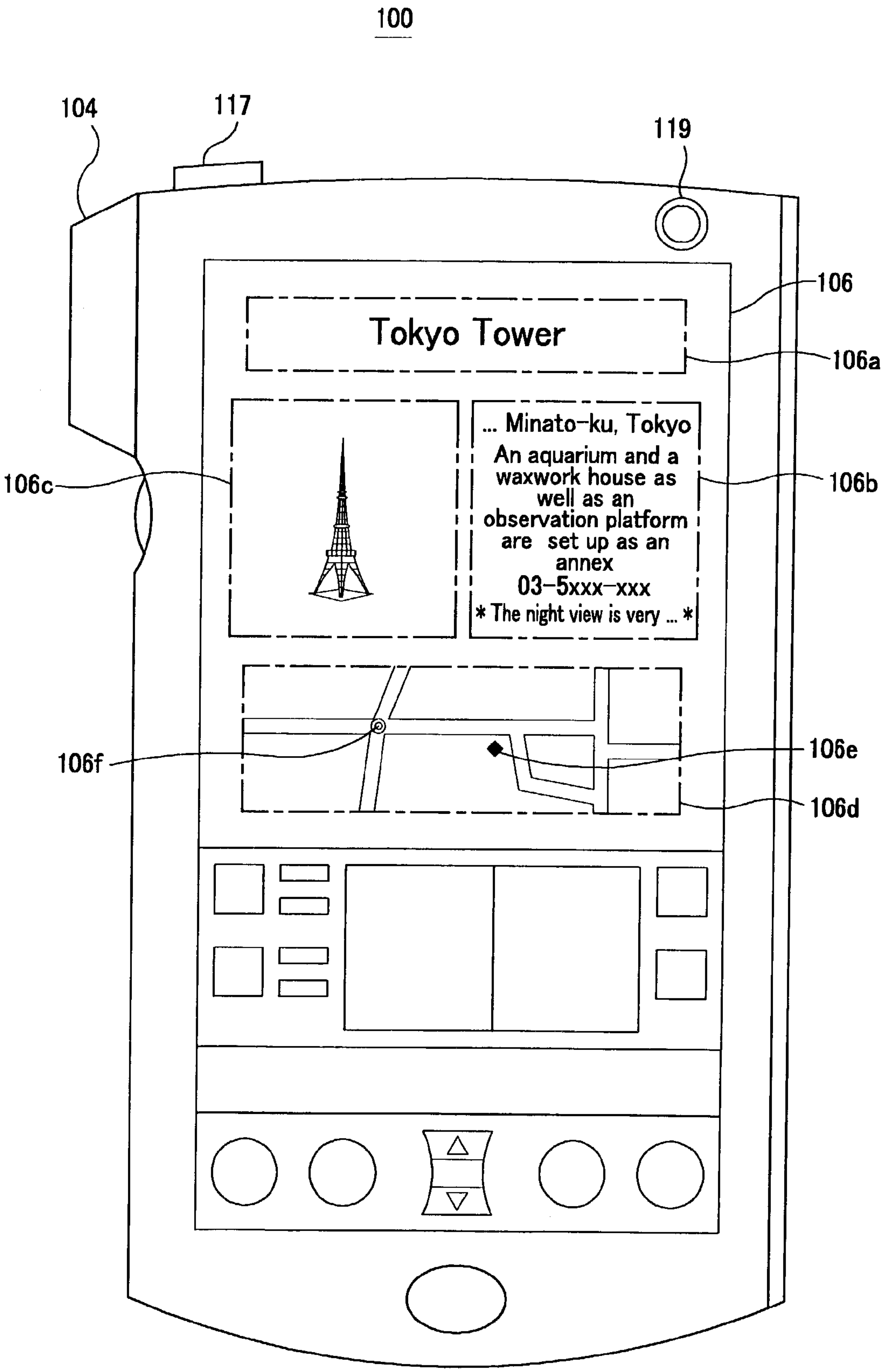
FIG. 11 shows an exemplary display of guide information corresponding to the POI information of FIG.10.

FIG. 10 shows a specific example of POI information. This POI information is described in XML (extensible markup language). FIG. 11 shows an exemplary display of guide information of facilities of interest corresponding to this POI information.

In FIG. 10, within a tag (<poi>) indicating POI information, a latitude (<lat>) tag and a longitude (<lon>) tag are described, enclosed by a position (<pos>) tag. "Tokyo Tower" is described in a name (<name>) tag, and a text ". . . Minato-ku, Tokyo" is described in an address (<address>) tag. Moreover, the postal code and telephone numbers are described in the corresponding tags.

Therefore, in the title display part 106_a_ of the screen on the LCD 106 of the personal digital assistant 100 (electronic travel guide device) shown in FIG. 11, a name of facilities of interest "Tokyo Tower" is displayed. Its address, telephone number and the like are displayed in the explanation display part 106_b_. In the map display part 106_d_, the location mark 106_e_ of the facilities of interest corresponding to the latitude and longitude information described in the latitude (<lat>) tag and the longitude (<lon>) tag in the position (<pos>) tag is displayed. In the map display part 106_d_, also the present position mark 106_f_ based on positioning information from the GPS unit 114 is displayed.

By using the POI format as shown in FIG. 10, data can be easily exchanged with another electronic travel guide device using an external recording medium such as a memory card. For example, in the case of a memory stick (trademark registered), since GLORIE (Global Location-related Information Exchange File Format) is defined as a location information exchange format, data exchange can be easily carried out by recording information in this format. When talking about a travel plan with a friend in advance, the user and his/her friend can view POI information in the format conformable to their devices and can reflect the POI information on maps by using data of the POI format and exchanging the data through an external recording medium, even though they have personal digital assistants (electronic travel guide devices) 100, 200 of different types, as shown in FIGS. 12A and 12B.

Figure 12A:
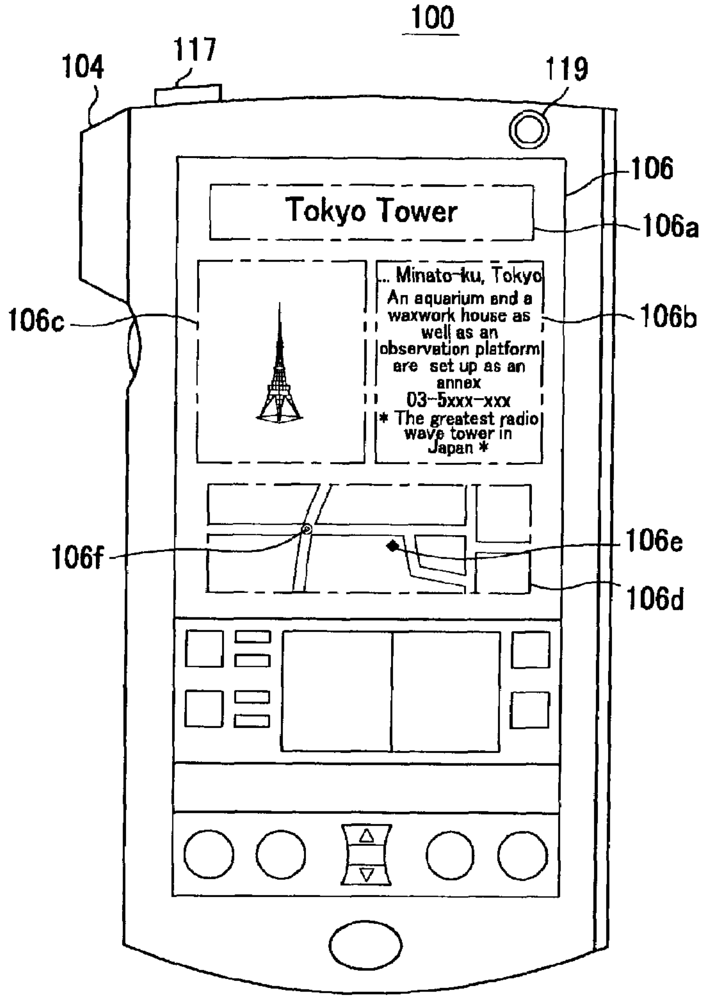
FIGS. 12A and 12B show exemplary displays on personal digital assistants of different types.
Figure 12B:
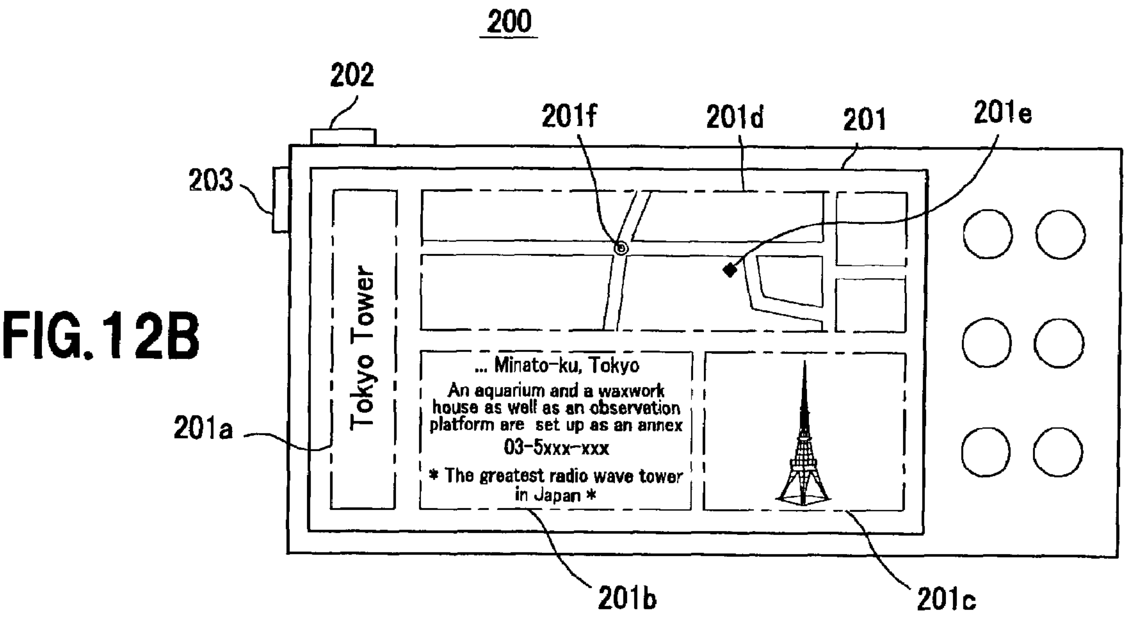

In the examples shown in FIGS. 12A and 12B, the electronic travel guide device 200 of FIG. 12B has a title display part 201_a_, an explanation display part 201_b_, a selected image display part 201_b_ and a map display part 201_d_ provided at different positions from those in the electronic travel guide device 100 of FIG. 12A. Of course, the size of the respective regions may vary in accordance with the size of the display unit and the device.

FIGS. 12A and 12B show the specific example of data exchange between the different personal digital assistants. However, data exchange can also be carried out between other devices that can handle POI information and display maps, for example, between a personal digital assistant and a digital still camera, or between a personal digital assistant and a portable telephone unit. Of course, POI information recorded in the POI format by a personal computer may be provided to an electronic travel guide device such as a personal digital assistant or a digital camera via a memory card as a medium.

As shown in FIG. 13, by adding a link file (<linkfile>) tag to POI information, then describing <text href =". . . /MEMO.TXT"> and </text> therein and designating a link to user information, the device can display in the explanation display part, for example, user information to the effect that "the night view is very beautiful" recorded in the form of text file (MEMO.TXT).

Figure 14:
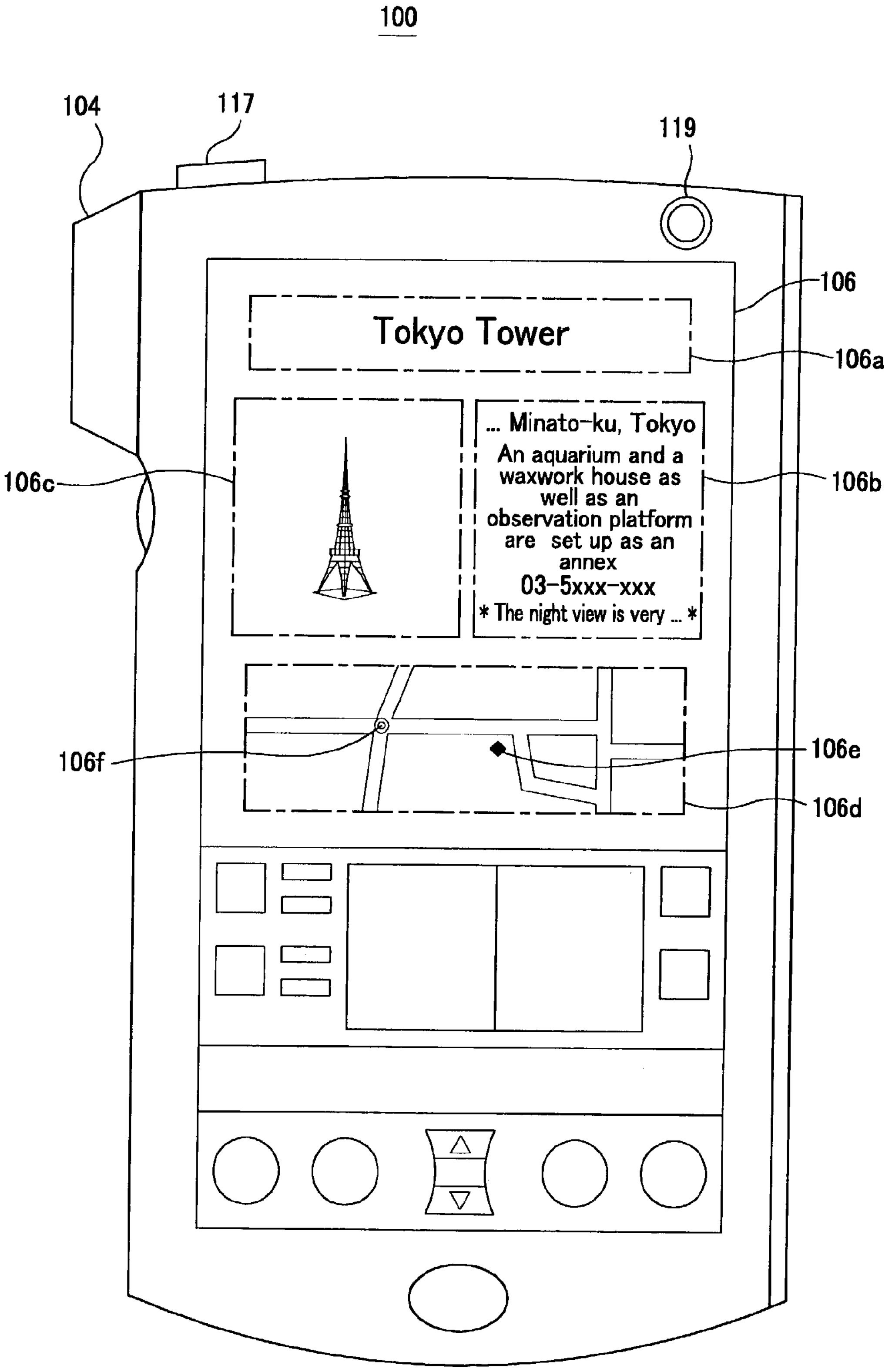
FIG. 14 shows an example in which text-based user information is displayed on the personal digital assistant.

FIG. 14 shows an example in which "* The night view is very beautiful *" is displayed in the explanation display part 106_b_ of the personal digital assistant 100. Similarly, by designating the link file in the POI information, it becomes possible to add "* It's huge *" in the explanation display part 10_b_ shown in FIG. 2 and "* Quite laughable *" in the explanation display part 106_b_ shown in FIG. 8 to the user information. Moreover, it is possible to write "* It's a must *" in association with [O O Museum of Art] in the guide information or to write a comment "xxxx is recommended" in association with [ΔΔ Restaurant], as described above.

Figure 15:
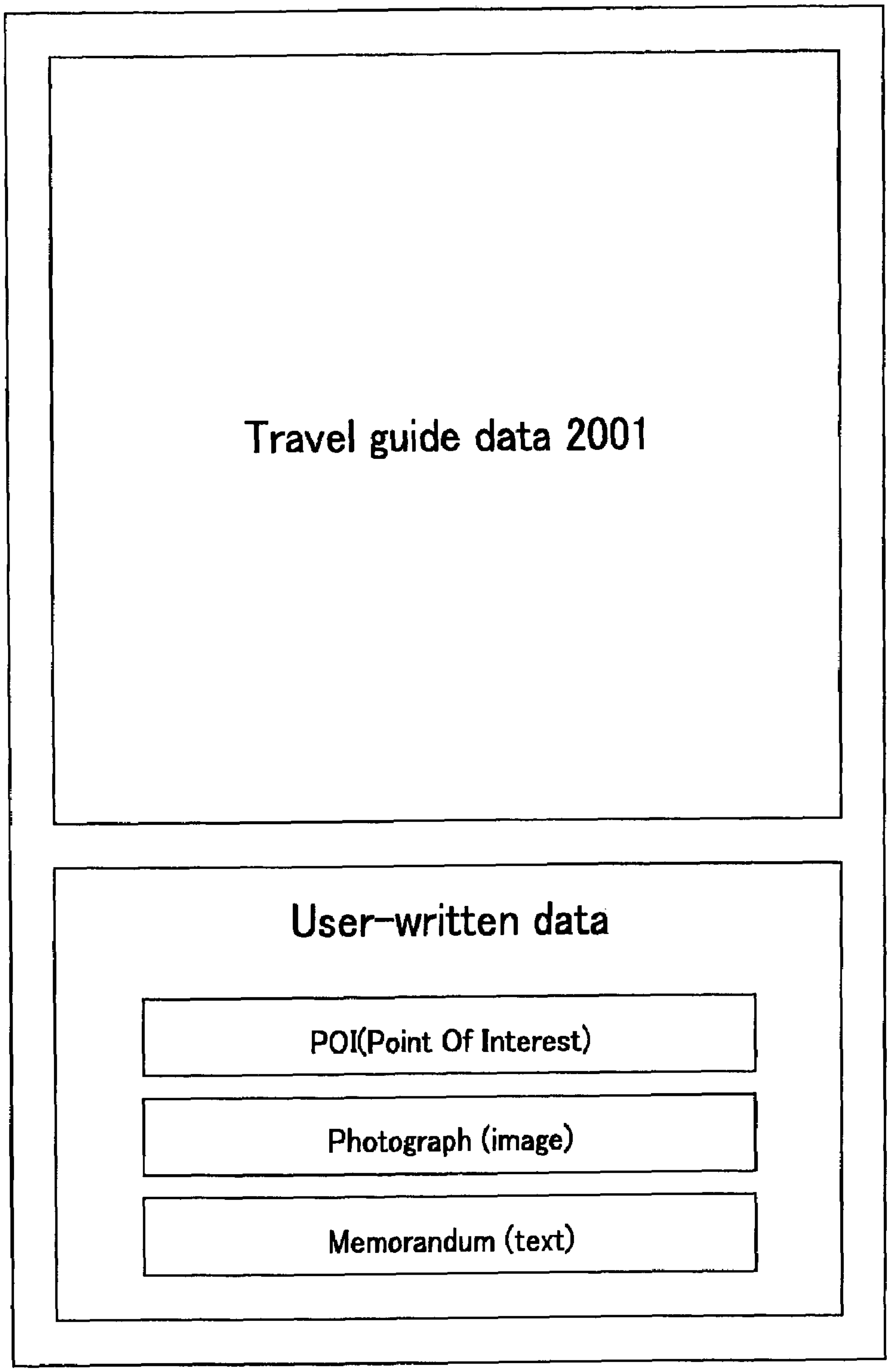
FIG. 15 schematically shows the recording state of guide information (travel guide data) and user information (user-written data).

FIG. 15 schematically shows the recording state of guide information (travel guide data) and user information (user-written data). "Travel guide data 2001" and "User-written data" are separately recorded. "User-written data" is made up of POI data, a photograph (image) and a memorandum (text). The POI data in this user-written data is recorded, for example, by a PC and additionally recorded later to the electronic travel guide device via a memory card as a medium.

The POI data is also described in the guide information "Travel guide data 2001". The POS data shown in FIGS. 12A and 12B is an exemplary description in the guide information.

Figure 16:
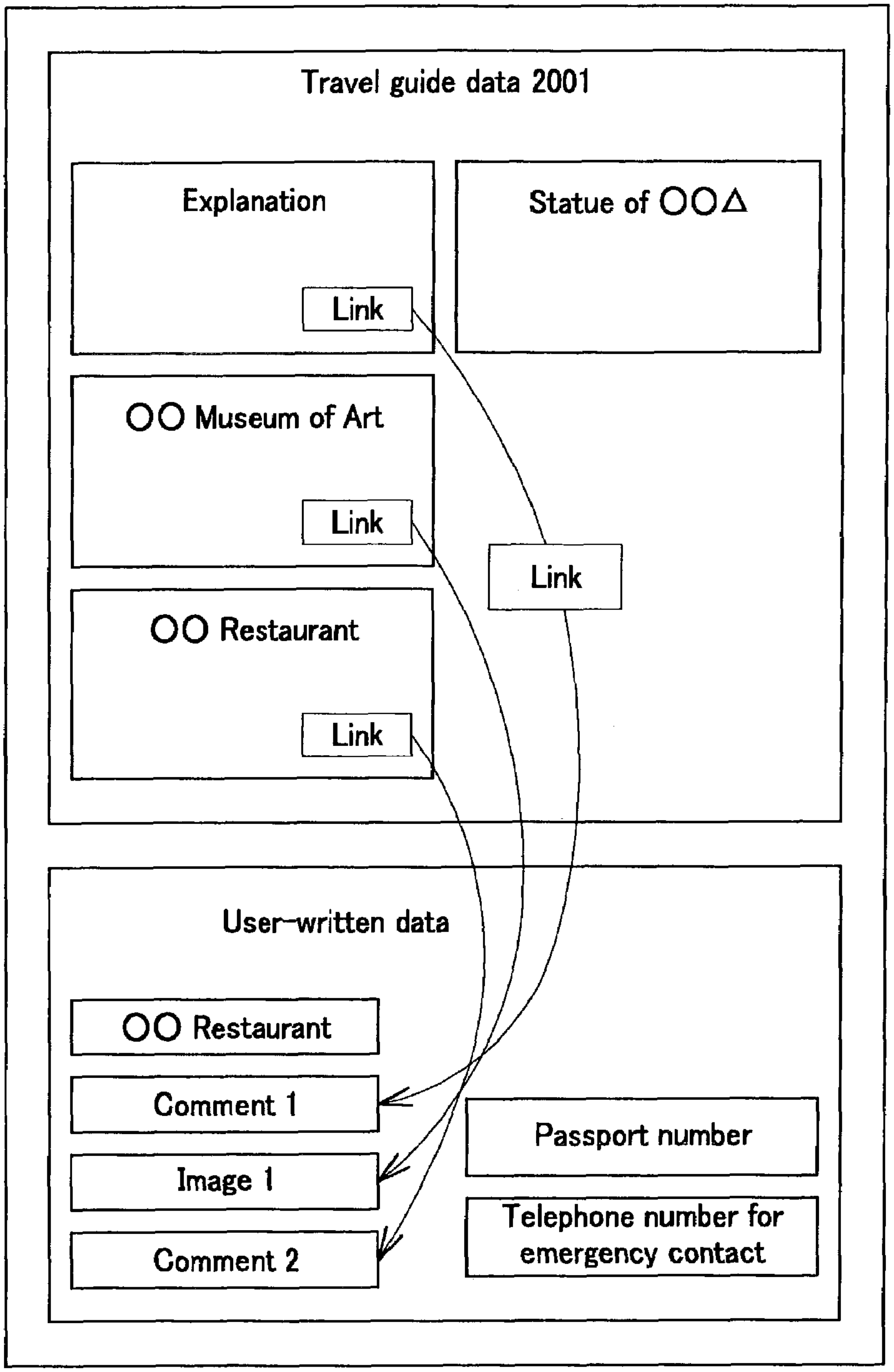
FIG. 16 shows a specific example of the case where a user writes unique information as user information.

FIG. 16 shows a specific example of the case where the user writes unique information as user information. The user collectively records data to be written, as a file or a record. In the guide data, link information to such data is described. For example, an explanation text displayed in the explanation display part is linked with a comment 1 so that a comment described as text data, for example, "It's a must", "It's huge", "Quite laughable", or "The night view is beautiful", is designated and displayed on the display unit. Also a photographic image of the museum is linked so that a photographic image 1 in the user-written data is designated and displayed on the display unit. Moreover, by using a link from POI information related to, for example, "O O Restaurant", described as guide information, a comment 2 of the user-written data is designated and user information "xxxx is recommended" is displayed on the display unit.

By linking the POI information with the names of tourist resorts and restaurants appearing in the explanation text displayed in the explanation display part, the user can immediately view detailed POI information.

Another exemplary operation enabled by the above-described structure of the personal digital assistant 100 will now be described. First, the user can take a photograph using the camera unit and record in the photograph the latitude and longitude of the place where it is taken. Thus, the place is plotted on the map or the link information is plotted. The photographs with the place name described therein can be organized to automatically prepare an album.

The user also can replace photographs in the travel guide information with photographs taken by the user himself/herself. By doing so, the user can save, for example, photographs in which the user appears as photographs used in the guidebook.

Moreover, by customizing the electronic travel guide device using photographs taken by the user, memoranda and information gathered by the user, the user can prepare and save his/her own travel record. The travel record can be outputted to an external recording medium or printed out. The data outputted to the external recording medium can be edited by a PC or the like.

In the case of making reservations of hotels and restaurants through the Internet or i-mode, it is possible to send a map of the reserved place and its latitude and longitude, for example, using the POI format. The information thus sent can be reflected on the map on the electronic travel guide device. The information can be displayed together with other hotels or a noticeable mark can be attached.

The names in the guide information may be displayed both in the local language and the user's mother tongue. Alternatively, the names in one of these languages may be attached as a superscript.

Now, travel guide information change processing to avoid change of the user information when the personal digital assistant 100(electronic travel guide device 100) performs version-up of the travel guide information provided from the vendor side will be described.

The electronic travel guide device 100 separately records guide information (travel guide data) and user information (user-written data), as described above and as shown in FIG. 17A. "User-written data" is made up of POI data, a photograph (image) and a memorandum (text).

Figures 17A, 17B:
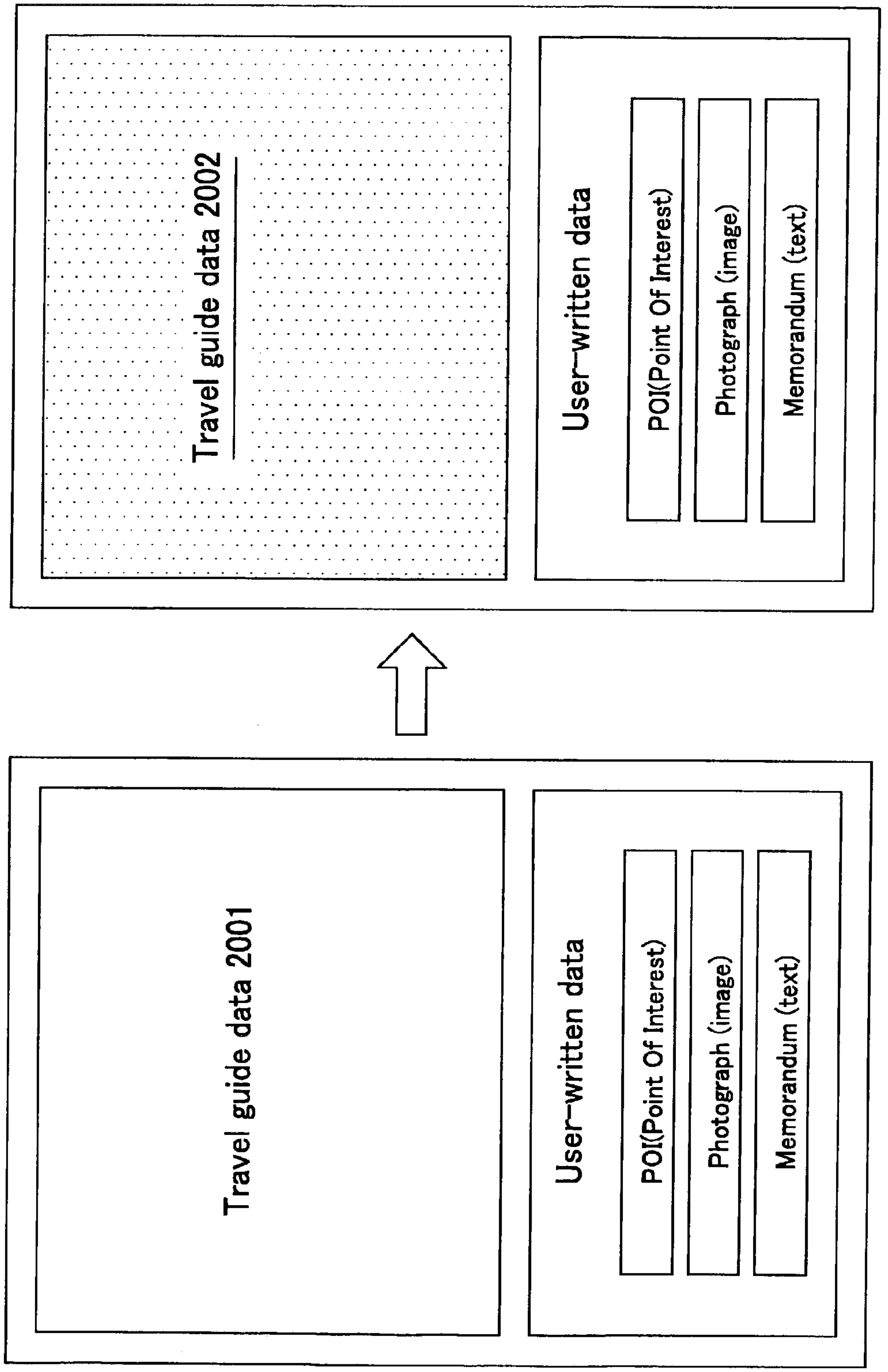
FIGS. 17A and 17B show an example of version-up of guide information.

At the time of version-up, since only the guide information (travel guide data) is an object of version-up, version-up of only the guide information can be easily carried out while leaving the user information unchanged, as shown in FIG. 17B.

Figure 18B:
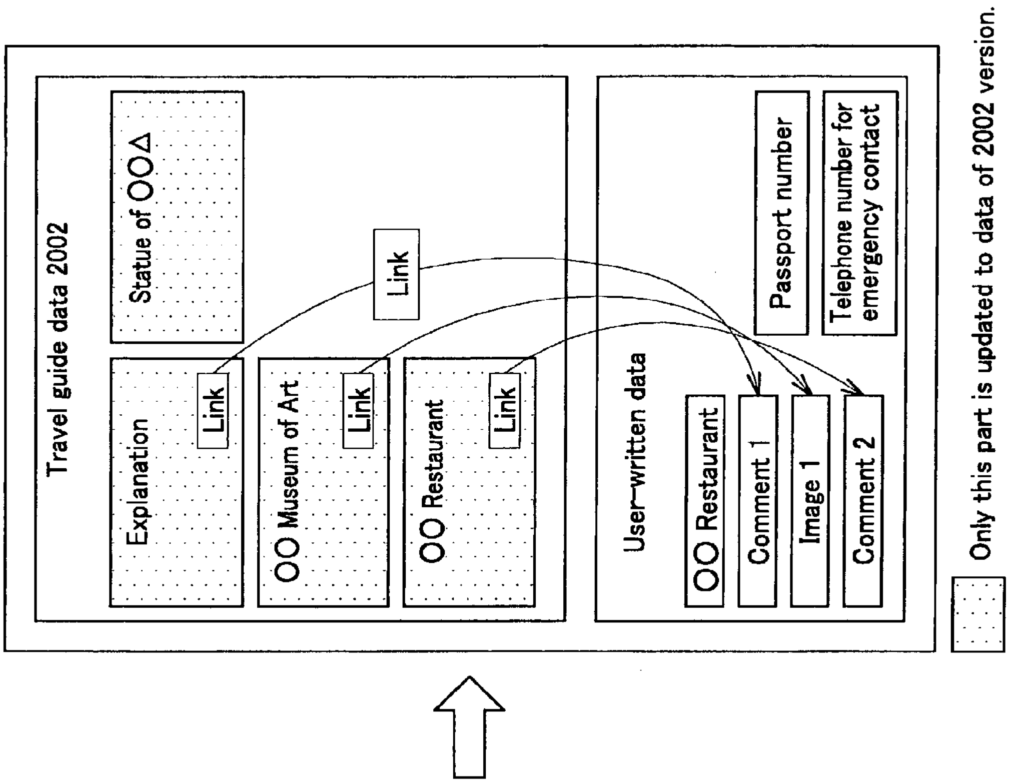
FIGS. 18A and 18B show an example of version-up in the case where there is a link to user information.
Figure 18A:
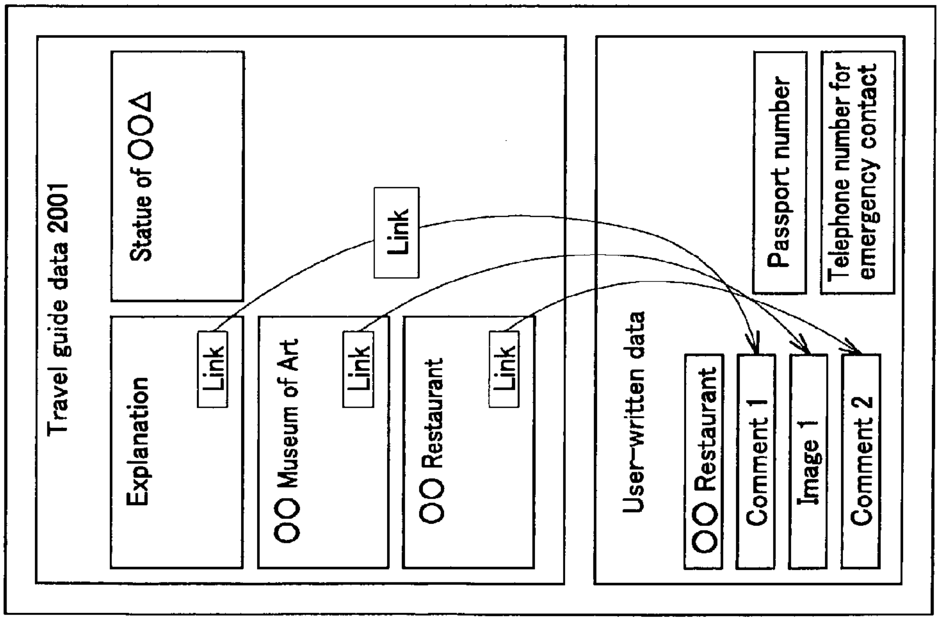

A specific example of version-up in the case where there is a link to user information will now be described with reference to FIGS. 18A and 18B and the flowchart of FIG. 5. This is included in the processing procedures in the case where the CPU 109 of the personal digital assistant 100 executes the guide information change processing program stored in the program ROM or the memory card 5. In this case, for example, there is version-up data in the guide information in the explanation display part.

As the CPU 109 judges at step S13 of FIG. 5 that there is data of the previous version in the explanation display part, the CPU 109 checks at step S14 whether there is a link to user information or not. In this example, since there is a link, the processing goes to step S15 and link information to the user, for example, as shown in FIG. 13, is temporarily saved. After that, version-up data is written at step S16, as shown in FIG. 18B. Then, the saved link information is restored.

For checking at step S13 whether there is data of the previous version or not, the latitude, longitude, name, address, telephone number and the like may be compared to judge the coincidence, in the case of POI information. For example, if travel guide information is recorded in the form shown in FIG. 13, when comparing the name, longitude and latitude, the coincidence of data can be judged by using "Tokyo Tower", latitude "35.6550" and longitude "139.7486". Therefore, the accompanying information may be updated to new data.

In this manner, since the electronic travel guide device 100 can perform version-up of only the travel guide information while leaving the user information unchanged, the user can use the unchanged user information written by himself/herself.

A fourth embodiment will now be described with reference to FIGS. 19 and 20. This fourth embodiment applies to a portable telephone 70 used as an electronic travel guide device. Similar to the personal digital assistant 100, this portable telephone 70 displays, on a display unit, user information made up of text data and photographic images in association with guide information, and also measures the location of itself and displays the location in a map on the display unit.

Figure 19:
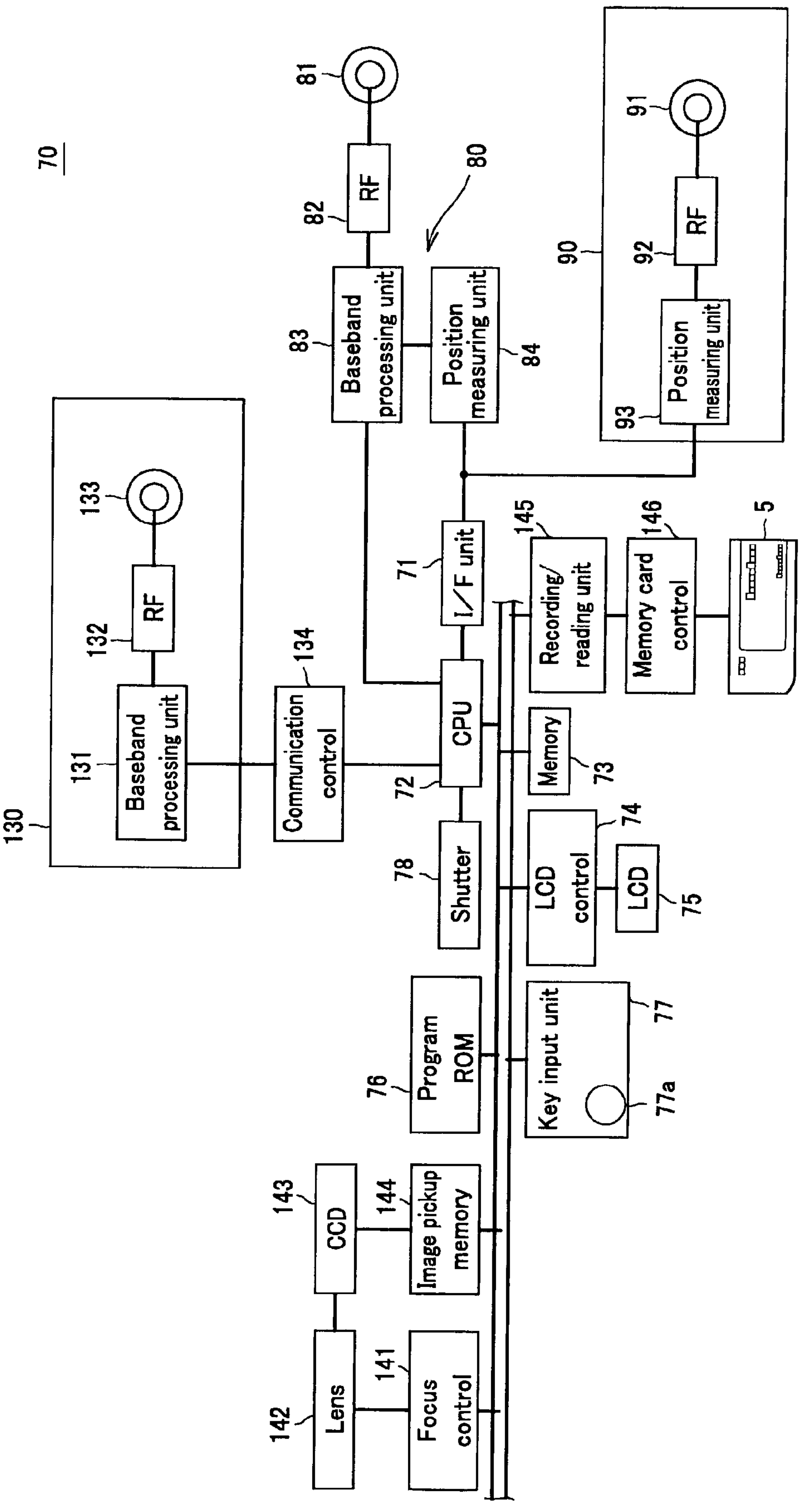
FIG. 19 is a block diagram showing a portable telephone of a fourth embodiment.

The portable telephone device 70 has a function capable of performing radio communication with a base station via an RF unit 82 and a portable telephone antenna 81 from a baseband processing unit 83 so as to enable voice communication and packet communication, as shown in FIG. 19. Information related to the communication status and operations is displayed on an LCD 75 through an LCD control unit 74. In the portable telephone device 70, the baseband processing unit 83, the RF unit 82 and the portable telephone antenna 81 constitute a portable telephone signal positioning processing unit for receiving base station signals from the portable telephone base station for measuring the position. The portable telephone device 70 also has a GPS receiving unit (hereinafter referred to as GPS unit) for receiving GPS signals from GPS satellites. A GPS antenna 91 constitutes the GPS unit. The portable telephone antenna 81 constitutes the portable telephone signal positioning processing unit. The portable telephone device 70 also has a local radio communication unit 130.

In the portable telephone signal positioning processing unit 80, the portable telephone antenna 81 receives radio waves from the portable telephone base station, and the RF processing unit 82 extracts signals therefrom. Then, the baseband processing unit 83 performs signal processing. As the phase difference of the processed signal is measured by the position measuring unit 84, the latitude and longitude of the present position is found. The information related to the communication status and operations, processed at the time of voice communication and packet communication, is displayed on the LCD 74 via the LCD control unit 74.

In the GPS unit 90, the GPS antenna 91 receives radio waves from GPS satellites and an RF processing unit 92 extracts signals therefrom. The signals are processed by a position measuring unit 93 and the latitude and longitude of the present position are thus found.

The local radio communication unit 130 sends and receives data to and from peripheral devices. Data to be sent can be passed through a communication control unit 134, mixed with a transmission wave by a local radio baseband processing unit 131, and sent to peripheral devices via a local radio communication antenna 133. On the other hand, the local radio communication unit 130 can receive data from other devices.

The latitude and longitude of the present position calculated by the portable telephone signal positioning processing unit 80 and the GPS unit 90 is sent to a CPU 72 via an interface (I/F) unit 71.

The CPU 72 is connected with a memory 73, the LCD control unit 74, a program ROM 76, a key input unit 77 and the like via buses.

In the program ROM 76, an operating system (OS) and application software to be executed following the OS, for example, a digital map display application, are stored. Also an application for converting positioning information to position display information on a map as a present position symbol is stored therein. By executing this application, the CPU 72 converts present position data to position display information on a map. Moreover, the electronic guide program is stored in the program ROM 76.

The portable telephone 70 also has a recording/reading unit 145 for recording map data to a memory card 5, and a memory card control unit 146. The operating system (OS), the application software to be executed following the OD, for example, a digital map display application, the application for converting positioning information to position display information on a map as a present position symbol, and the electronic guide program may be stored in this memory card.

The portable telephone 70 also has a focus control unit 141, a lens 142, a CCD 143, an image pickup memory 144, and a shutter 78 in order to shoot an object and acquire its photographic image, as in the digital camera 30 shown in FIG. 6. An image of an object shot by using a lens 142 that is adjusted for focusing by the focus control unit 141 is converted to an image signal by the CCD 143 and recorded as a digital signal (image data) to the image pickup memory 144. This image (photographic image) of the object is displayed on the LCD 75 via the LCD control unit 74. The user confirms this and presses the shutter 78.

Figure 20:
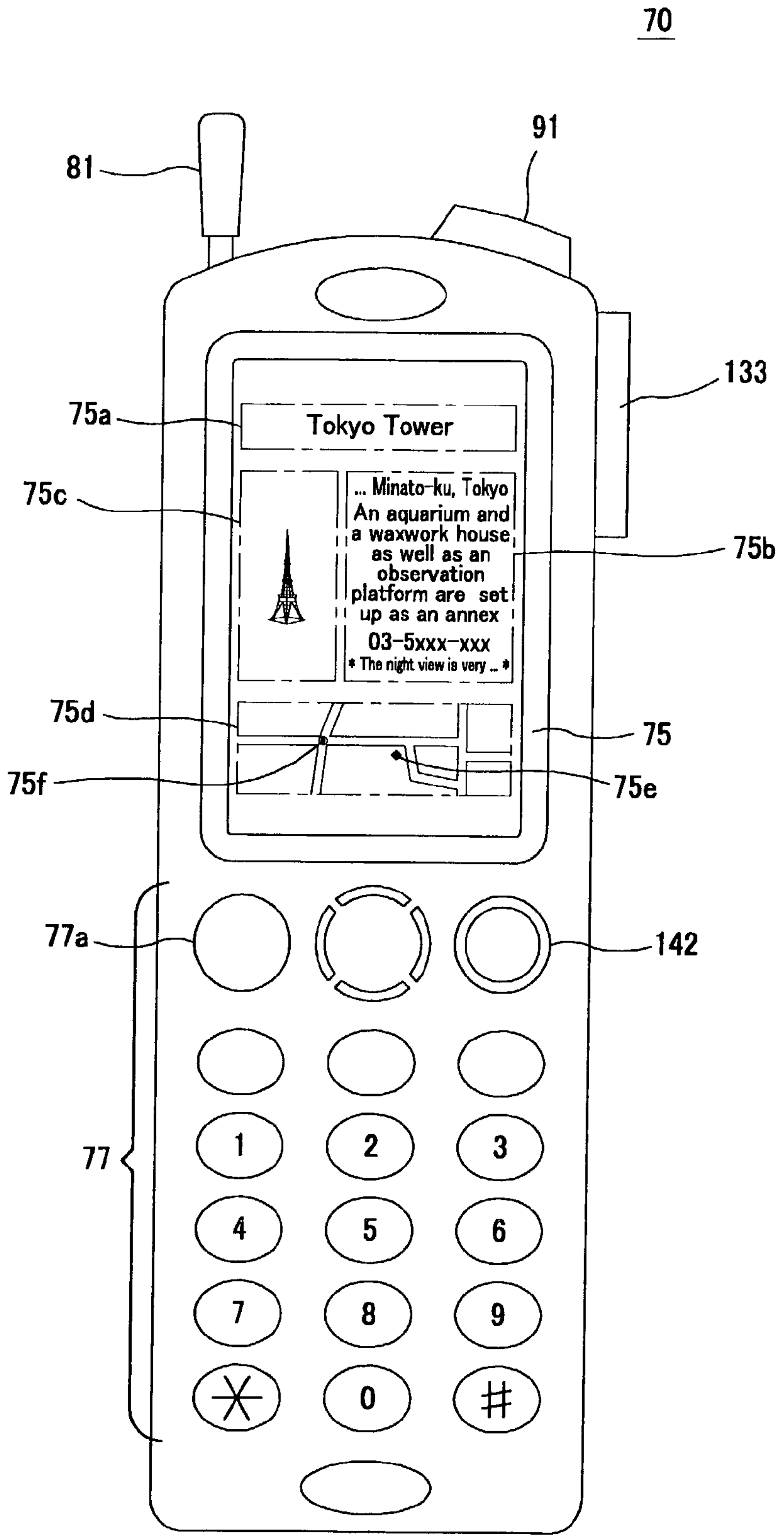
FIG. 20 shows an appearance of and an exemplary display on the portable telephone.

FIG. 20 shows an appearance of and an exemplary display on the portable telephone 70. The local radio communication antenna 133 is arranged on the right lateral side. The GPS antenna 91 is arranged on the right side on the top part and the portable telephone antenna 81 is arranged on the left side on the top part. In a title display part 75*a* of the screen on the LCD 75, a name of facilities of interest "Tokyo Tower" in the case where the portable telephone 70 was used as an electronic travel guide device is displayed. In an explanation display part 75*b*, user information in the form of text data as well as guide information is displayed. In a selected image display part 75*c*, a photographic image showing an appearance of "Tokyo Tower" is displayed as guide information. In this selected image display part 75*c*, a photographic image taken by the user as the user information may be displayed in accordance with the selection by the user. In a map display part 75*d*, a location mark 75*e* of "Tokyo Tower" as the facilities of interest and a present position mark 75*f* obtained through measurement by the GPS unit 90 of the portable telephone 70 are displayed.

As the portable telephone 70 is used as an electronic travel guide device, texts, image and map are displayed at the same time. If the user views a map covering the position where the user is now, the user can confirm his/her own position on the map. Since the latitude and longitude are recorded in map data irrespective of whether its format is a vector format or image format, the present position can be displayed using not only positioning information acquired by the GPS unit 90 but also positioning information acquired from other equipments via the local radio communication unit 130 and positioning information acquired from the base station via the portable telephone signal positioning processing unit 80. Also the setting of destination and navigation including route guide are possible. Of course, since the portable telephone 70 can handle the POI information, it can carry out processing similar to the processing described with reference to FIGS. 10 to 16.

Moreover, since the electronic travel guide device based on the portable telephone 70 can also perform version-up of only the travel guide information while leaving the user information unchanged, the user can use the unchanged user information written by himself/herself. This is because guide information change processing procedures similar to those described with reference to FIG. 15, FIG. 13, FIGS. 17A and 17B, and FIGS. 18A and 18B can be applied.

Figure 21:
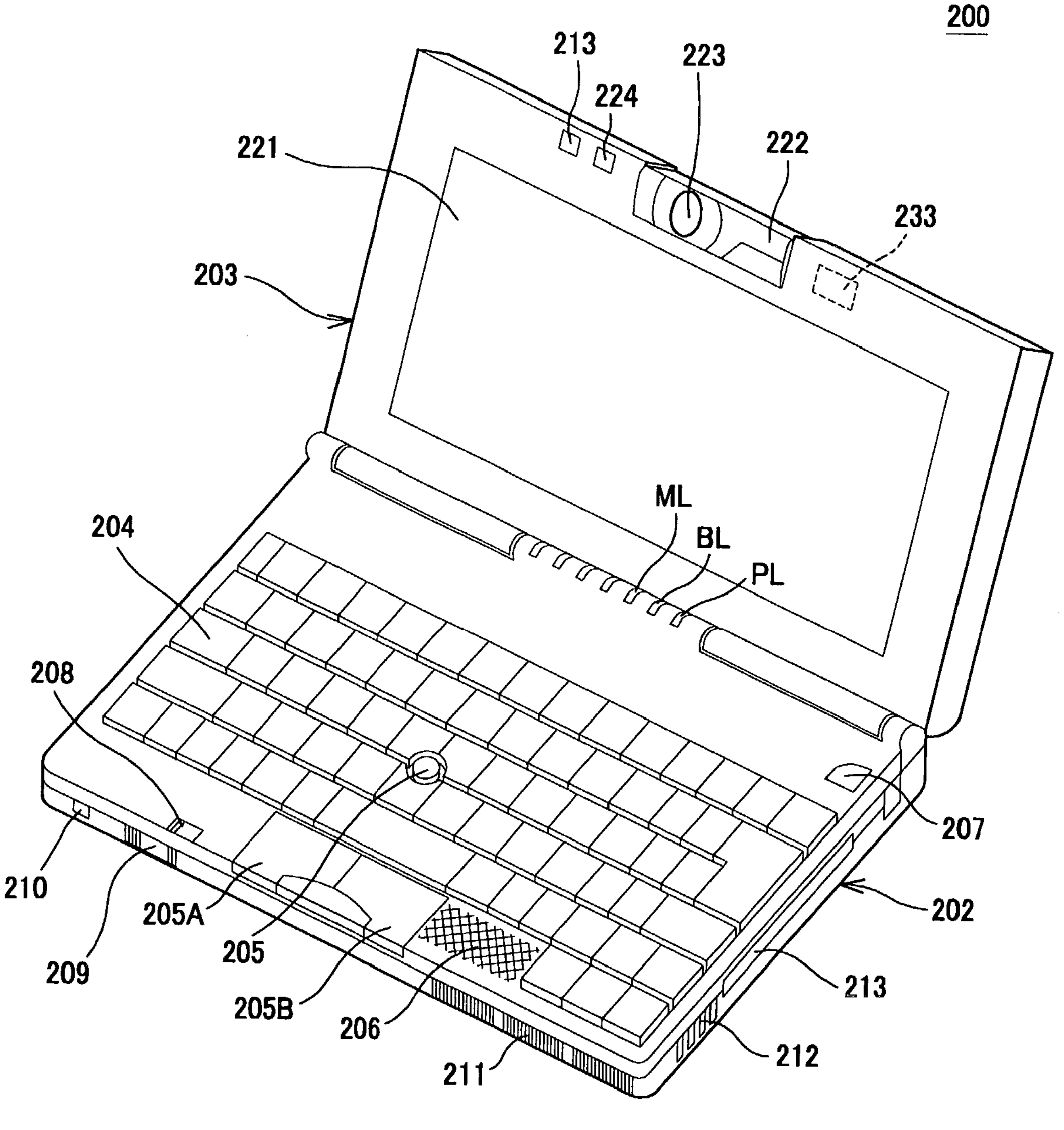
FIG. 21 shows an appearance of a portable personal computer device of a fifth embodiment.

A fifth embodiment will now be described with reference to FIG. 21. This fifth embodiment applies to a portable personal computer device 200 used as an electronic travel guide device.

This portable personal computer device 200 is, for example, a portable personal computer device with a size of B5 or less that is easy to carry. The portable personal computer device 200 has a GPS antenna 258 for acquiring positioning information from GPS signals, and a local radio communication unit 230 for receiving positioning information from other equipments.

The portable personal computer device 200 is made up of a body 202 and a display unit 203 which is mounted to open and close to the body 202 and in which a local radio communication antenna 233, which will be described later, of the local radio communication unit 230 is provided.

On the top side of the body 202, a plurality of operating keys 204 for inputting various characters, symbols and numerals, a stick-like pointing device 205 for moving a cursor displayed for input on the display unit 203, a built-in speaker 206, and a shutter button 207 for operating to pick up an image using a CCD camera 223 provided in the display unit 203 are provided.

On the front side of the display unit 203, a liquid crystal display 221 made up of an LCD is provided. At an upper end part of the center of the front side, an image pickup unit 222 having the CCD camera 223 is mounted rotatably to the display unit 203.

Specifically, the image pickup unit 222 can rotate within an angular range of 180 degrees between the front side and the back side of the display unit 203 and can be positioned at an arbitrary position. Moreover, an adjustment ring for adjusting the focus of the CCD camera 223 is provided in the image pickup unit 222.

On the front side of the display unit 203, a microphone 224 is provided on the left of the image pickup unit 222, so that sounds can be collected from the back side of the display unit 203 via the microphone 224.

At a lower end part of the center of the front side of the display unit 203, a power lamp PL made up of an LED (light-emitting diode), a battery lamp BL, a message lamp ML and other lamps for various purposes are provided.

At an upper end part of the center of the front side of the display unit 203, a pawl 213 is provided on the left of the microphone 224. A hole part 208 is provided at a predetermined position on the body 202 corresponding to the pawl 213. Thus, as the display unit 203 is closed to the body 202, the pawl 213 is fitted and locked in the hole part 208.

On the back side of the display unit 203, the local radio communication antenna 233 is provided, which will be described later.

On the front side of the body 202, a slide lever 209 is provided. As the slide lever 209 is slid in a direction of an arrow along the front side, the pawl 213 fitted in the hole part 208 is unlocked to enable the display unit 203 to open from the body 202.

Moreover, on the front side of the body 202, a programmable power key (PPK) 210 for turning the power on, then starting predetermined application software (hereinafter referred to simply as application) and automatically executing a series of preset operations, by one button operation, is provided at a left end part, and a plurality of air intakes 211 are provided at a right end part.

Of course, as the portable personal computer device 200 is used as an electronic travel guide device, texts, image and map are displayed at the same time. If the user views a map covering the position where the user is now, the user can confirm his/her own position on the map. Since the latitude and longitude are recorded in map data irrespective of whether its format is a vector format or image format, the present position can be displayed using not only positioning information acquired by the GPS unit 90 but also positioning information acquired from other equipments via the local radio communication unit. Also the setting of destination and navigation including route guide are possible. Of course, since the portable personal computer device 200 can handle the POI information, it can carry out processing similar to the processing described with reference to FIGS. 10 to 16.

Moreover, since the electronic travel guide device based on the portable personal computer device 200 can also perform version-up of only the travel guide information while leaving the user information unchanged, the user can use the unchanged user information written by himself/herself. This is because guide information change processing procedures similar to those described with reference to FIG. 15, FIG. 13, FIGS. 17A and 17B, and FIGS. 18A and 18B can be applied.

As described above, using the first to fifth embodiments, for example, the user can carry travel guide information and dictionaries in one personal digital assistant, portable telephone, digital camera or portable personal computer device, and the present position can be displayed on maps shown on the device. Therefore, it is a new and very convenient traveling tool to carry. Since the maps may be road maps used in a car navigation device or tourist maps, the user can easily read these maps. Moreover, since the user can customize the electronic travel guide device with the user's favorite information and can prepare his/her unique electronic travel guide device, the user can carry the latest information such as information gathered by word of mouth on the Internet or information given by friends.

Particularly when this is applied to a device with a digital camera function, the user needs to carry only this device including a digital camera. Therefore, the user can reduce his/her baggage and enjoy convenience. Moreover, since a travel record can be recorded with photographs, sight-seeing information of places that change year after year can be saved together and left as a record.

While the present invention is applicable to an electronic travel guide device in the above description, the present invention is also applicable to, for example, a guide device for handling guide information of a plurality of destinations, held by a person in charge of marketing, or a guide device for handling guide information of a plurality of destinations, held by a person in charge of nursing.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions and equivalents can be implemented without departing from the scope and spirit of the present invention as set forth and defined by the appended claims.

What is claimed is:

1. An information processing device for processing guide information including one or more characters, images, and map data related to destinations and facilities of interest, the device comprising:

storing means for storing the guide information and user information, the user information including text entered by the user;

recording means for recording the guide information and the user information separately on the storing means;

linking means for adding a link, connecting the guide information to the user information, to the guide information;

updating means for temporarily saving the link separate from the guide information; updating the guide information, after temporarily saving the links, by writing a new version of the guide information to the storing means without modifying the user information; and writing the saved link into the updated guide information upon completion of updating the guide information;

display means for displaying the guide information and displaying the user information including the text entered by the user; and control means for causing the display means to display a present position mark corresponding to positioning information obtained by measuring a present position of the device, and routes to the destinations and facilities of interest.

2. The information processing device as claimed in claim 1, further comprising a present position measuring means for acquiring the positioning information.

3. The information processing device as claimed in claim 1, wherein positions of the destinations and facilities of interest are read from the map data in the guide information.

4. The information processing device according to claim 1, wherein the new version of the guide information includes new business hours for a facility.

5. The information processing device according to claim 1, wherein the new version of the guide information includes one or more of:

updated information on how to make a phone call in a foreign country; and updated dictionary information or language information for the foreign country.

6. An information processing device for processing guide information including one or more characters, images, and map data related to destinations and facilities of interest, the device comprising:

storing means for storing the guide information and user information, the user information including text entered by the user;

recording means for recording the guide information and the user information separately on the storing means;

linking means for adding a link, connecting the guide information to the user information, to the guide information;

updating means for temporarily saving the link separate from the guide information; updating the guide information, after temporarily saving the link, by writing a new version of the guide information to the storing means without modifying the user information; and writing the saved link into the updated guide information upon completion of updating the guide information;

display means for displaying the guide information and displaying the user information including the text entered by the user; and control means for saving the user information and the guide information to an external recording medium, or outputting the user information and the guide information to an external interface.

7. The information processing device as claimed in claim 6, wherein the control means causes the display means to display the user information, a present position mark corresponding to positioning information acquired by measuring a present position of the device, and routes to the destinations and facilities of interest, as well as the guide information.

8. An information processing method for processing guide information including one or more characters, images, and map data related to destinations and facilities of interest, the method comprising:

storing the guide information and user information, the user information including text entered by the user;

separately recording the guide information and the user information;

adding a link, connecting the guide information to the user information, to the guide information;

temporarily saving the link separate from the guide information;

updating the guide information, after temporarily saving the link, by writing a new version of the guide information without modifying the user information;

writing the saved link into the updated guide information upon completion of updating the guide information;

displaying the guide information;

displaying the user information including the text entered by the user; and displaying the guide information in association with the user information.

9. The information processing method as claimed in claim 8, further comprising:

checking, from a recording medium storing at least the guide information and selectively storing the user information related to the guide information, the presence or absence of the user information; and displaying only the guide information or the guide information and user information in accordance with the presence or absence of the user information.

10. An information processing method for processing guide information including one or more characters, images, and map data related to destinations and facilities of interest, the method comprising:

storing the guide information and user information, the user information including text entered by the user;

separately recording the guide information and the user information;

adding a link, connecting the guide information to the user information, to the guide information;

temporarily saving the link separately from the guide information;

updating the guide information, after temporarily saving the link, by writing a new version of the guide information without modifying the user information;

writing the saved link into the updated guide information upon completion of updating the guide information;

displaying the guide information;

displaying the user information including the text entered by the user; and displaying images taken by a user in place of the one or more images included in the guide information.

11. An information processing method for processing guide information with a device, the guide information including one or more characters, images, and map data related to destinations and facilities of interest, the method comprising:

storing the guide information and user information, the user information including text entered by the user;

separately recording the guide information and the user information;

adding a link, connecting the guide information to the user information, to the guide information;

temporarily saving the link separate from the guide information;

updating the guide information, after temporarily saving the link, by writing a new version of the guide information without modifying the user information;

writing the saved link into the updated guide information upon completion of updating the guide information;

displaying the guide information;

displaying the user information; and displaying a present position mark corresponding to positioning information obtained by measuring a present position of the device, and routes to the destinations and facilities of interest.

12. An information processing method for processing guide information including one or more characters, images, and map data related to destinations and facilities of interest, the method comprising:

storing the guide information and user information, the user information including text entered by the user;

separately recording the guide information and the user information;

adding a link, connecting the guide information to the user information, to the guide information;

temporarily saving the link separate from the guide information;

updating the guide information, after temporarily saving the link, by writing a new version of the guide information without modifying the user information;

writing the saved link into the updated guide information upon completion of updating the guide information;

displaying the guide information;

displaying the user information; and saving the user information and the guide information to an external recording medium, or outputting the user information and the guide information to an external interface.

13. A computer readable medium storing an information processing program for causing an information processing device to process guide information including one or more characters, images, and map data related to destinations and facilities of interest, the process comprising:

storing the guide information and user information, the user information including text entered by the user;

separately recording the guide information and the user information;

adding a link, connecting the guide information to the user information, to the guide information;

temporarily saving the link separate from the guide information;

updating the guide information, after temporarily saving the link, by writing a new version of the guide information without modifying the user information;

writing the saved link into the updated guide information upon completion of updating the guide information;

displaying the guide information;

displaying the user information including the text entered by the user; and displaying the guide information in association with the user information.

14. The computer readable medium according to claim 13, wherein the process further comprises:

checking, from a recording medium storing at least the guide information and selectively storing the user information related to the guide information, the presence or absence of the user information; and displaying only the guide information or the guide information and user information in accordance with the presence or absence of the user information.

15. A computer readable medium storing an information processing program for causing an information processing device to process guide information including one or more characters, images, and map data related to destinations and facilities of interest, the process comprising:

storing the guide information and user information, the user information including text entered by the user;

linking means for adding a link, connecting the guide information to the user information, to the guide information;

separately recording the guide information and the user information;

temporarily saving the link separate from the guide information;

updating the guide information, after temporarily saving the link, by writing a new version of the guide information without modifying the user information;

writing the saved link into the updated guide information upon completion of updating the guide information;

displaying the guide information;

displaying the user information including the text entered by the user; and displaying images taken by a user in place of the one or more images included in the guide information.

16. A computer readable medium storing an information processing program for causing an information processing device to process guide information including one or more characters, images, and map data related to destinations and facilities of interest, the process comprising:

storing the guide information and user information, the user information including text entered by the user;

separately recording the guide information and the user information;

adding a link, connecting the guide information to the user information, to the guide information;

temporarily saving the link separate from the guide information;

updating the guide information, after temporarily saving the link, by writing a new version of the guide information without modifying the user information;

writing the saved link into the updated guide information upon completion of updating the guide information;

displaying the guide information;

displaying the user information including the text entered by the user; and displaying a present position mark corresponding to positioning information obtained by measuring a present position of the device, and routes to the destinations and facilities of interest.

17. A computer readable medium storing an information processing program for causing an information processing device to process guide information including one or more characters, images, and map data related to destinations and facilities of interest, the process comprising:

storing the guide information and user information, the user information including text entered by the user;

adding a link, connecting the guide information to the user information, to the guide information;

separately recording the guide information and the user information;

temporarily saving the link separate from the guide information;

updating the guide information, after temporarily saving the link, by writing a new version of the guide information without modifying the user information;

writing the saved link into the updated guide information upon completion of updating the guide information;

displaying the guide information;

displaying the user information including the text entered by the user; and saving the user information and the guide information to an external recording medium, or outputting the user information and the guide information to an external interface.

* * * * *

UNITED STATES PATENT AND TRADEMARK OFFICE

CERTIFICATE OF CORRECTION

PATENT NO. : 7,490,294 B2
APPLICATION NO. : 10/348106
DATED : February 10, 2009
INVENTOR(S) : Shizue Okuda It is certified that error appears in the above-identified patent and that said Letters Patent is hereby corrected as shown below:

On the title page, item (75), “Okada,” should read --Okuda,--.

Signed and Sealed this

Ninth Day of June, 2009

JOHN DOLL
*Acting Director of the United States Patent and Trademark Office*